(12) United States Patent
Mukherjee

(10) Patent No.: US 6,226,322 B1
(45) Date of Patent: May 1, 2001

(54) ANALOG RECEIVE EQUALIZER FOR DIGITAL-SUBSCRIBER-LINE COMMUNICATIONS SYSTEM

(75) Inventor: Subahashish Mukherjee, Bangalore (IN)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/050,620

(22) Filed: Mar. 30, 1998

(51) Int. Cl.$^7$ .............................. H03H 7/30; H03H 5/00; H03B 1/38
(52) U.S. Cl. ................... 375/229; 375/222; 375/233; 333/28 R
(58) Field of Search .................................. 375/222, 229, 375/233; 333/28 R, 172; 330/293, 304, 101, 94, 92, 82, 87, 260; 708/323

(56) References Cited

U.S. PATENT DOCUMENTS

| | | | |
|---|---|---|---|
| 3,628,116 | * 12/1971 | Prelkscaht | 318/257 |
| 3,863,173 | * 1/1975 | Scheib et al. | 330/98 |
| 4,105,945 | * 8/1978 | Sano et al. | 330/294 |
| 4,125,813 | * 11/1978 | Cubbison, Jr. | 330/259 |
| 4,868,516 | * 9/1989 | Hendernson et al. | 330/86 |

OTHER PUBLICATIONS

"A Discrete Multitone Transceiver System for HDSL Applications," Chow et al., *IEEE Journal on Selected Areas In Communications*, vol. 9, No. 6, Aug. 1991, pp. 895–908.

"A Self–Calibration Technique for Monolithic High–Resolution D/A Converters," Groeneveld et al., *IEEE Journal of Solid–State Circuits*, vol. 24, No. 6, Dec. 1989, pp. 1517–1522.

"Multicarrier Modulation for Data Transmission: An Idea Whose Time Has Come," John A. C. Bingham, *IEEE Communications Magazine*, May 1990, pp. 5–8 and 11–14.

"Multicarrier Primer," Cioffi, John M., Tutorial submitted to Standards Committee T1 of IEEE, 1991, pp. 1–18.

* cited by examiner

*Primary Examiner*—Chi Pham
*Assistant Examiner*—Khai Tran
(74) *Attorney, Agent, or Firm*—J. Dennis Moore; Wade James Brady, III; Frederick J. Telecky, Jr.

(57) ABSTRACT

Digital subscriber modems (8, 15) for use in Asynchronous Digital Subscriber Line (ADSL) communications are disclosed. Each modem includes a digital transceiver function (10, 13) and an analog front end function (10, 11), where the analog front end function (10, 11) is integrated into a single integrated circuit. According to the disclosed embodiments, the analog front end functions (10, 11) each include a transmit and a receive side. The transmit side includes oversampled registers (44C, 44R) and digital filters (46C, 46R) which serve to increase the sample rates of the digital data to be transmitted, so that the analog-to-digital converter (48C, 48R) operates in an oversampled manner, and so that the downstream analog low pass filters (50C, 50R) can be realized with relatively simple, low-order filters. On the receive side, digital filter functions (64C, 64R) are included downstream from the analog-to-digital converters (62C, 62R), to minimize the complexity of the receive-side analog filters (58C, 58R). The remote DSL modem (8) also includes an equalizer function (57) to boost the signal amplitude with increasing frequency, to overcome the effects of line attenuation on the high frequency downstream transmissions.

27 Claims, 8 Drawing Sheets

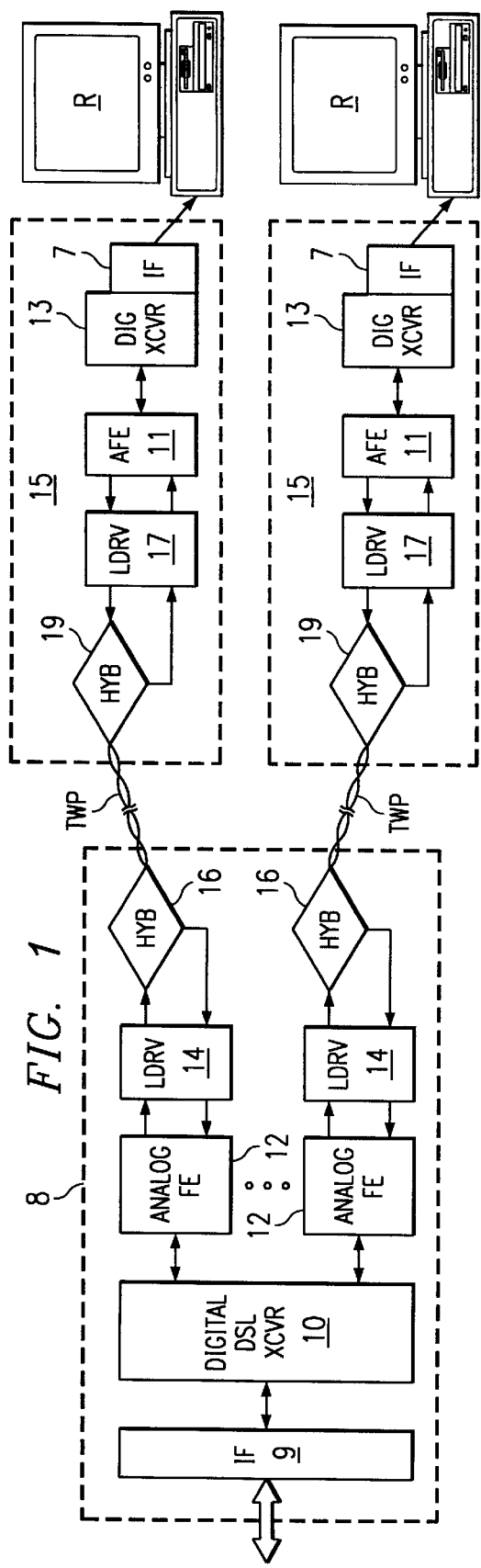
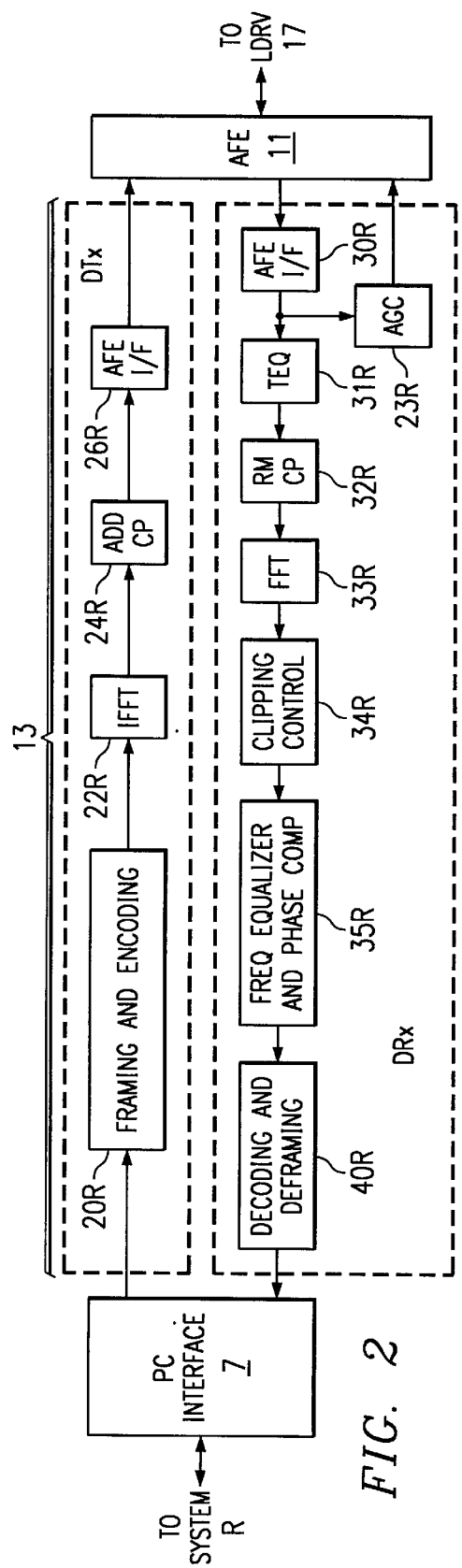

ANALOG RECEIVE EQUALIZER FOR DIGITAL-SUBSCRIBER-LINE COMMUNICATIONS SYSTEM

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

This invention is in the field of telecommunications systems, and is more specifically directed to signal processing and interface circuitry in subscriber-line modems.

The high-speed exchange of digital information between remotely located computers is now a pervasive part of modem computing in many contexts, including business, educational, and personal computer uses. It is contemplated that current and future applications of high speed data communications will continue the demand for systems and services in this field. For example, video on demand (VOD) is one area which has for some time driven the advancement of technology in the area of digital information exchanges. More recently, the rapid increase in use and popularity of the Global Internet (hereinafter, the "Internet") has further motivated research and preliminary development of systems directed to advanced communication of information between remotely located computers, particularly in effecting higher bit-rates using existing infrastructure.

One type of technology arising from the above and continuing to evolve is referred to in the art as digital subscriber line ("DSL"). DSL refers generically to a public network technology that delivers relatively high bandwidth over conventional telephone company copper wiring at limited distances. DSL has been further separated into several different categories of technologies according to a particular expected data transfer rate, the type and length of medium over which data are communicated, and schemes for encoding and decoding the comununicated data.

In each case, a DSL system may be considered as a pair of communicating modems, one of which is located at a customer site, such as a home or office computer, and the other of which is located at a network controller site, typically a telephone company central office. Within the telephone company system, this modem is connected to communicate with some type of network, often referred to as a backbone network, which is in communication with other communication paths by way of equipment such as routers or Digital Subscriber Line Access Multiplexers (DSLAMs). Through these devices, the backbone network may further communicate with dedicated information sources and with the Internet. As a result, information accessible via the backbone network, such as Internet information, may be communicated between the central office DSL modem and a customer site having its own compatible DSL modem.

Within this general system, it is also anticipated that data rates between DSL modems may be far greater than current voice modem rates. Indeed, current DSL systems being tested or projected range in rates on the order of 500 Kbps to 18 Mbps or higher. According to certain DSL techniques, the data communication rates are asymmetric, with a considerably higher data rate used for so-called downstream communication, that is from the central office to the customer site, than for upstream communication from the customer site to the central office. Most DSL technologies also do not use the whole bandwidth of the twisted pair, reserving a relatively low bandwidth channel for conventional voice telephonic communication (commonly referred to as "POTS" for "Plain Old Telephone Service"), so that voice and data communications may be simultaneously carried out over the same line.

By way of further background, examples of DSL technologies currently being developed include High-Bit-Rate Digital Subscriber Line ("HDSL"), Single-Line Digital Subscriber Line ("SDSL"), and Very-high-data-rate Digital Subscriber Line ("VDSL"). HDSL has a symmetric data transfer rate, communicating at the same speed in both upstream and downstream directions. Current perceived speeds are on the order of 1.544 Mbps of bandwidth, but require two copper twisted pairs. However, the operating range of HDSL is somewhat limited, currently to distances of approximately 12,000 feet or less, beyond which signal repeaters are required. SDSL delivers comparable symmetric data transfer speed as HDSL, but achieves these results with a single copper twisted pair which limits the range of an SDSL system to approximately 10,000 feet. Lastly, VDSL provides asymmetric data transfer rates at much higher speeds, such as on the order of 13 Mbps to 52 Mbps downstream, and 1.5 Mbps to 2.3 Mbps upstream, but only over a maximum range of 1,000 to 4,500 feet.

The most publicized DSL technology currently under development is referred to as Asymmetric Digital Subscriber Line, or "ADSL," and corresponds to ANSI standard T1E1.413. ADSL technology encompasses communication according to Discrete Multitone (DMT) modulation, and also includes frequency domain multiplexing (FDM); other modulation techniques, such as Carrierless Amplitude/Phase modulation (CAP), are also known in the art. In any case, according the current state of the art, it is contemplated that ADSL systems will communicate data over a single copper twisted pair at downstream (central office to remote modem) rates on the order of 1.5 Mbps to 6 Mbps, with upstream rates ranging from 16 kbps to 640 kbps. A particular example of the ADSL technology utilizes a downstream (central office to remote) signal bandwidth of 25 kHz to 1104 kHz, and an upstream (remote to central office) signal bandwidth of 25 kHz to 138 kHz; in this realization, echo cancellation is especially necessary at the remote modems, since its transmission bandwidth is within the bandwidth of its received traffic. In any event, because the ADSL technology enables these high bandwidths to be attained over existing twisted pair infrastructure, telephone companies are not only contemplating providing Internet access using ADSL technology, but are also considering delivering remote LAN access and VOD services using this approach.

Of course, in addition to performance considerations and to the distance over which DSL communications may be carried by conventional twisted-pair infrastructure, the cost of the modem hardware is also a significant factor in the selection of a communications technology. It is therefore contemplated that a lower data rate technology may provide high-speed data communications, with downstream data rates exceeding 1 Mbps, over existing twisted-pair networks and at cost that is competitive with conventional non-DSL modems, such as 56 k, V0.34, and ISDN modems.

Because of-the nature of DSL communications, so-called mixed-signal circuitry is required in the implementation of DSL modems, both for the central office and also for the remote subscribers, in which both analog and digital signals are handled. Conventional DSL modem designs include functions which are referred to as "analog front ends", in which operations such as digital-to-analog and analog-to-digital conversion, power amplification, and some amount of filtering (including low-pass, band-pass, and high-pass filtering) is performed. Because of the frequencies involved in DSL technology, ranging from tens of kHz to MHz frequencies, and because of the large dynamic range required in order to accommodate the wide variations in length and quality of subscriber loops, the filtering involved in conventional DSL modems is relatively complex. As a result, typical analog front end circuitry has heretofore been realized by discrete analog circuitry, using close tolerance components to eliminate manufacturing variations. The complex filter characteristics in these conventional modems, particularly in providing a filter with the steep band rejection requirements of the DSL standards, prevents effective integration of these analog filters into an integrated circuit, especially when considering that the filter characteristics must follow process variations in the digital-to-analog converters. Specifically, it is contemplated that the integration of this analog front end circuitry into mixed signal integrated circuits would require significant "trimming" of the analog filter bandwidths in order to compensate process variations.

By way of further background, it is known in the art that significant attenuation of signals can often occur over conventional twisted pair telephone lines, particularly at the frequencies used in DSL communications. As is also well known, this attenuation is exacerbated with decreasing wire gage, with increasing wire length, and with increasing signal frequency, with the severity of this attenuation being up to on the order of −100 dB in some cases. However, conventional analog-to-digital converters (ADCs) typically have a quantization noise floor which is substantially flat over frequency. As a result, signal loss can occur in the event that the higher frequency signals are attenuated to below the quantization noise floor of the receiving ADC.

BRIEF SUMMARY OF THE INVENTION

It is therefore an object of the present invention to provide an integrated circuit which compensates for frequency-dependent line attenuation in DSL communications.

It is a further object of the present invention to provide such an integrated circuit in which frequency-domain equalization is provided in analog front end functionality in a DSL modem system.

It is a further object of the present invention to provide such an integrated circuit in which the equalization function may be efficiently implemented into an integrated circuit.

It is a further object of the present invention to provide such an integrated circuit in which the characteristics of the equalization function are selectable.

It is a further object of the present invention to provide such an integrated circuit in which a portion of the equalization circuitry is shared by a downstream filter.

Other objects and advantages of the present invention will be apparent to those of ordinary skill in the art having reference to the following specification together with its drawings.

The present invention may be implemented into an analog front end integrated circuit for digital subscriber line (DSL) modems, particularly for those modems receiving high frequency signals, such as the remote DSL modem. In the analog front end circuit of the present invention, the equalization function may be implemented as a cascade of two operational amplifier stages with selectable input and feedback impedances. In the preferred embodiment of the invention, the equalization function is performed in the analog domain, prior to analog-to-digital conversion, because the frequency-dependent line attenuation can, at high frequencies, attenuate the signal to a level below the frequency-independent quantization noise floor of the analog-to-digital converter. According to a further embodiment of the invention, the second operational amplifier stage may be shared with the first stage of a downstream ladder filter, for further efficiency in implementation. The present invention may thus be readily integrated into an analog front end integrated circuit.

BRIEF DESCRIPTION OF THE SEVERAL VIEWS OF THE DRAWING

FIG. 1 is an electrical diagram, in block form, of a digital subscriber line (DSL) modem system, illustrating the location of DSL modems both at the remote, end user, locations and also at a central office in the telephone system.

FIG. 2 is a signal flow diagram, in block form, of the digital transceiver function in the remote DSL modem of the system of FIG. 1 according to the preferred embodiment of the invention.

DETAILED DESCRIPTION OF THE INVENTION

Figure 3:
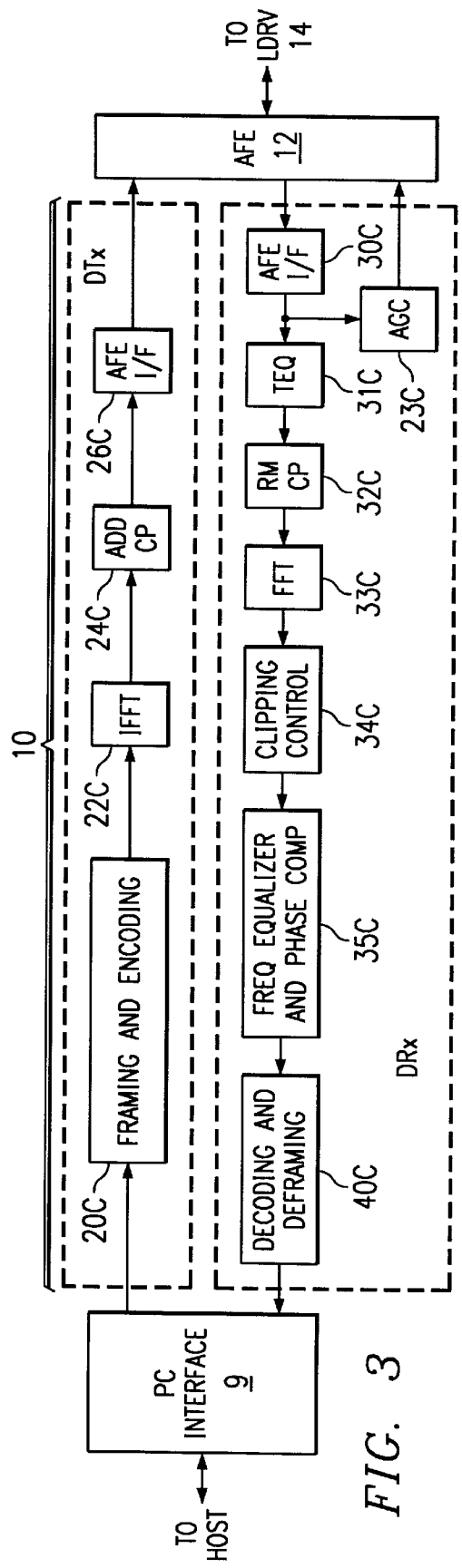
FIG. 3 is an electrical diagram, in block form, of the digital transceiver function in the central office DSL modem of the system of FIG. 1 according to the preferred embodiment of the invention.

Referring first to FIG. 1, a telecommunications system into which the present invention may be realized will now be described. The system of FIG. 1 illustrates a contemplated digital subscriber line (DSL) application of the present invention, and specifically one in which asymmetric DSL (ADSL) technology is used. It is of course contemplated that the present invention may also be beneficial in other system applications. However, given the stringent requirements presented by modem DSL standards, particularly in filter performance and bit rate, it is contemplated that the present invention is particularly well-suited for use in connection with DSL technology.

FIG. 1 illustrates a typical system installation of DSL services, in which multiple remote subscribers interface with a telephone system central office. In this example, a user in a home or office environment operates remote computer system R, such as a personal computer or workstation, or alternatively an entertainment unit in the video-on-demand (VOD) context. Each of remote computer systems R serves as a remote source and destination of communicated data, which may be representative of text, graphics, motion pictures, audio, etc. Each remote system R is associated with a remote DSL modem 15, by way of which the remote system R communicates with central office DSM modem 8 over a conventional twisted-pair telephone facility TWP. One or more telephones (not shown) may also be connected into each twisted pair wire facility TWP, such that POTS voice communications may alternatively or additionally be communicated over twisted pair wire facility TWP.

As illustrated in FIG. 1, each of twisted pair wire facilities TWP is received by central office DSL modem 8, which is contemplated to be located in a central office of the local or long distance telephone service provider. Central office modem 8, in this example, is capable of receiving multiple twisted pair wire facilities TWP (only two of which are illustrated in this example). Central office modem 8 provides communication of data between twisted pair wire facilities TWP, and thus remote systems R, and a host computer (not shown in FIG. 1) which serves as the source or destination of data, or as an intermediate gateway to a network, such as the Internet, or a dedicated "dial-up" content provider or network. Of course, the central office will typically also include switchgear for the routing of calls such as those placed by remote systems R (or associated telephones) over twisted pair wire facilities TWP. As noted above, central office modem 8 will likely be connected to a backbone network, which in turn is in communication with other communication paths by way of equipment such as routers or Digital Subscriber Line Access Multiplexers (DSLAMs). In the application where POTS service overlays the ADSL data traffic, such equipment may also include some type of "splitter" for separating POTS from the data traffic, routing the POTS traffic to the conventional telephone network (PSTN) and routing the data to a wide-area network (WAN).

In the specific example of FIG. 1, the DSL technology is of the asymmetric type (i.e., ADSL), with traffic traveling from central office modem 8 to remote modems 15 (i.e., downstream) at a signal bandwidth of 25 kHz to 1104 kHz, and traffic traveling from remote modems 15 to central office modem 8 (i.e., upstream) at a signal bandwidth of 25 kHz to 138 kHz. Of course, the present invention may be implemented to benefit in other ADSL and DSL arrangements, with the appropriate adjustment to the particulars of the filters and other functions, as will become apparent to those of ordinary skill in the art having reference to this specification.

In the example of FIG. 1, remote DSL modems 15 are each arranged as a plurality of functions, which roughly correspond to individual integrated circuits in this exemplary embodiment of the invention. It is of course to be understood that the particular integrated circuit, or "chip", boundaries among these various functions may vary among implementations; the exemplary realization illustrated in FIG. 1 is provided by way of example only. In this example, each of remote DSL modems 15 include a host interface 7, for interfacing digital transceiver function 13 with its associated remote system R. Host interface 7 is of conventional construction for such interface functions, and will of course depend upon the kind of bus to which DSL modem 15 is connected (e.g., serial bus, PCI, ISA); an example of host interface 7 is the TNETD2100 digital serial bus interface circuit available from Texas Instruments Incorporated.

According to this embodiment of the invention, digital transceiver function 13 in remote DSL modems 15 is a programmable device for executing the necessary digital processing operations for both transmission and receipt of the data payload. These operations, which will be described in detail hereinbelow, include such functions as formatting of the digital data from the host computer system (into packets and frames, for example), encoding of the data into appropriate subchannels for transmission, and performing an inverse Fast Fourier Transform (IFFT) to transform the encoded data into time domain signals; on the receive side, digital transceiver function 13 performs the reverse of these operations, as well as echo cancellation processing. Particularly at the data rates discussed hereinabove, the digital data processing capacity and power of digital transceiver function 13 is preferably of a high level; an example of an architecture suitable for use as digital transceiver function 13 is a digital signal processor such as the TMS320C6x type, available from Texas Instruments Incorporated.

Referring now to FIG. 2, the signal flow through, and digital functions performed by, digital transceiver function 13 according to the preferred embodiment of the present invention will now be described in more detail. As illustrated in FIG. 2, digital transceiver function 13 includes a transmit side DTx and a receive side DRx, through which signals are transmitted by remote system R to twisted pair facility TWP, and received from twisted pair facility TWP by remote system R, respectively. As noted above, digital transceiver function 13 is preferably a programmable processor according to this embodiment of the invention, and as such the block diagram of FIG. 2 corresponds to functions performed by digital transceiver function 13, rather than specific hardware components therewithin. As such, all of the operations within digital transceiver function 13 as illustrated in FIG. 2 are performed in the digital domain.

On transmit side DTx, signals received by digital transceiver function 13 from PC interface 7 are first applied to framing and encoding process 20R. In this embodiment of the invention, these received signals are in the form of digital words to be communicated over twisted pair facility TWP. Framing and encoding process 20R, in the general sense; arranges these data words into packets within in a physical layer frame, which is then modulated to multiple DMT subcarriers, or subchannels. This arrangement is performed by formatting each packet of data to include a header field in advance of the data for synchronization, and a circular redundant code (CRC) field following the data field to permit error detection, including the insertion of "dummy" data to maintain modem synchronization, to check the signal-to-noise ratio of various subchannels, and to ensure that bad subchannels are not used. Encoding of the packeted data is then performed in process 20R. For example, according to the DMT approach, digital data is encoded to correspond to a point in an amplitude-phase "constellation". Discussion of the encoding of DMT data may be found in Cioffi, "A Multicarrier Primer", Tutorial submitted to Standards Committee T1 of IEEE (1991); Chow, et al., "A Discrete Multitone Transceiver System for HDSL Applications", *Journal on Selected Areas in Communications*, Vol. 9, No. 6 (IEEE, August 1991), pp. 895–908; and Bingham, "Multicarrier Modulation for Data Transmission: An Idea Whose Time Has Come", *IEEE Communications Magazine* (May, 1990), pp. 5–14, all incorporated herein by this reference. As is known in the art, DMT associates each possible digital value (depending upon the bit loading for the particular subchannel or subcarrier) with an amplitude and phase combination. For example, if a subcarrier has been assigned to a bit loading of four, the constellation for that subcarrier includes sixteen possible amplitude-phase combinations, each associated with one of the sixteen possible digital values; if a subcarrier has been assigned to a bit loading of eight, two-hundred fifty-six amplitude-phase combinations are present in the constellation, each associated with one of the two-hundred fifty-six possible digital values presented by the eight bits. The smaller constellations are preferably a subset of the largest (eight-bit) constellation, for ease of encoding. However, the less-populated constellations will have less power than the more heavily populated subchannels, and as such gain scaling of the subchannels is preferred to amplify the less-populated subchannels. Furthermore, it is preferred to encode subcarriers as a group, for efficiency of operation where digital transceiver function 13 is implemented by way of a pipelined digital signal processor (DSP); this grouping combines multiple sub-carriers into 16-bit word units, such that each sub-carrier is confined within a word boundary. Some subcarriers will have their bit loading reduced by one or more bits as necessary to maintain this grouping. It is also preferred to pre-group subcarriers as part of the initialization process to generate a pre-stored macro of the subcarrier grouping, eliminating the need for conditional call and conditional branch operations in the DSP code.

In this example, ordering of the data according to subchannel and its unpacking is also performed in process 20R, along with the mapping of the data into the constellation points within each subcarrier, preferably through use of a look-up table. Scaling of the amplitudes of the various subchannels is also carried out in process 20R. The grouping and encoding of process 20R effectively converts each of the data words received from interface 7 into the frequency domain, as the output of process 20R is a sequence of amplitude and phase values (encoded by the constellations), with the order in the sequence corresponding to the frequency of the associated subchannels. Clipping control can then be applied, if appropriate, simply by monitoring overflow flags in the status register of the digital transceiver function 13; upon detection of an overflow, certain bits (referred to as operation and maintenance bits (OAM) bits) are set and a pilot tone is added, indicating that the transmitter is repairing the clipped frame over the next two frames; these two frames will be combined and decoded by the receiving modem 8, in this example.

IFFT process 22R is then next performed upon the encoded data from framing and encoding process 20R, to generate time-domain signals corresponding to the encoded subcarriers. In this example, IFFT process 22R generates thirty-two tones (for the relatively low frequency upstream signals) for this communication. Following IFFT process 22R, process 24R adds a circular prefix to interframe portions of the sequence as a guard time, which permits a time-domain equalizer filter in the receiving modem 8 to have the appropriate impulse response. The encoded time-domain digital data, with circular prefix, is then applied to analog front end function (AFE) 11 in the form of a bitstream, via AFE interface process 26R.

On receive side DRx, digital transceiver function 13 receives a digital data bitstream from AFE 11, via AFE interface function 30R. Automatic gain control (AGC) process 23R maintains proper gain control within AFE 11, in the conventional manner. According to this exemplary implementation, time domain equalizer (TEQ) process 31R is provided in digital transceiver function 13 to eliminate intersymbol interference (ISI) that may be present, and particularly that which is introduced by analog filters in AFE 11 for separating the upstream and downstream traffic over twisted pair wire facility TWP, as will be described in further detail hereinbelow. TEQ process 31 according to this embodiment of the invention is a conventional finite impulse response (FIR) filter that is implemented by way of a software routine performed by a digital signal processor (DSP). The coefficients of TEQ process 31R are determined during initialization, as these coefficients depend upon the response of twisted pair wire facility TWP.

Following the intersymbol interference filtering of TEQ process 31, digital transceiver function 13 applies process 32R to the bitstream to eliminate the circular prefixes. Fast Fourier Transform (FFT) process 33R performs a 256-point FFT to account for the 128 tones used in the high-frequency downstream transmission received by remote modem 10. Clipping control process 34R restores any words that were separated in transmission due to overflow, as noted above, and the resultant frequency-domain sequence is applied to frequency equalizer and phase compensation process 35R. Frequency domain equalizer (FEQ) and phase compensation process 35R flattens the signal spectrum of the received sequence, and compensates for phase distortion. Decoding and deframing process 40R performs the inverse of the transmission sequence, including bit demapping and gain scaling, tone reordering and packing process, and deframing and flow control, resulting in a digital word that is applied to remote system R via PC interface 7.

Referring back to FIG. 1, and as illustrated in FIG. 2, digital transceiver function 13 is bidirectionally connected to AFE 11 according to the preferred embodiment of the invention. Each AFE 11, in this exemplary embodiment of the present invention, is a mixed-signal (i.e., involving both digital and analog operations) integrated circuit which provides all loop interface components necessary for DSL communications other than those which involve high voltages. In this regard, AFEs 11 in each of remote DSL modems 15 perform both transmit and receive interface functions, in a manner which will be described in further detail hereinbelow.

AFEs 11 in each of remote modems 15 bidirectionally interface with line driver 17, which is a high-speed line driver and receiver for driving and receiving the ADSL signals on twisted pair facility TWP. An example of a line driver integrated circuit suitable for use according to the preferred embodiment of the invention is the THS6002 line driver available from Texas Instruments Incorporated. Line drivers 17 in remote modems 15 are connected to a four-wire to two-wire "hybrid" integrated circuit 19, which converts the dedicated transmit and receive lines from line driver 17 to the two-wire arrangement of twisted pair facility TWP, in full-duplex fashion.

In the central office, central office DSL modem 8 includes host interface 9 which connects modem 8 to a host computer (not shown). Host interface 9 may, as noted above, be implemented by conventional circuitry such as the TNETD2100 digital serial bus interface circuit available from Texas Instruments Incorporated. As noted above, the host computer will interface central office modem 8 to a splitter for separating POTS from the data traffic, as noted above, and thus to the conventional telephone network (PSTN) and wide-area network (WAN) as appropriate for the service being provided. Central office modem 8 includes digital DSL transceiver function 10, which connects to multiple analog front end functions (AFEs) 12 as shown in FIG. 1.

Digital transceiver function 10 is similarly constructed as and performs similar processing to digital transceiver functions 13 in remote DSL modems 15, with certain differences in function arising from the different frequencies of its received and transmitted traffic, as will be described in detail hereinbelow. As before, digital transceiver function 10 is preferably implemented as a high-performance digital signal processor, such as the TMS320C6x, available from Texas Instruments Incorporated.

FIG. 3 illustrates the signal flow and functionality of digital transceiver function 10 in central office modem 8. Like reference numerals (with suffix C) are used in FIG. 3 to correspond to similar functions as described hereinabove relative to digital transceiver function 13 in remote modems 15.

In summary, on transmit side DTx, signals received by digital transceiver function 10 from PC interface 9 are first applied to framing and encoding process 20C, which generates encoded data, in frame format, which is modulated into DMT subcarriers, or subchannels in this embodiment of the invention, followed by scaling and clipping control as described hereinabove. IFFT process 22C transforms the encoded data into time-domain signals corresponding to the encoded subcarriers, and process 24C adds a circular prefix to interframe portions of the sequence. This encoded time-domain digital data, with circular prefix, is then applied to AFE 12 in the form of a bitstream, via AFE interface process 26C.

On receive side DRx, digital transceiver function 10 receives a digital data bitstream from AFE 12, via AFE interface function 30C. AGC process 23C is included in digital transceiver function 10, as noted above for digital transceiver function 13. Time domain equalizer (TEQ) process 31C eliminates intersymbol interference (ISI), using a finite impulse response (FIR) filter, after which process 32C removes the circular prefixes from the bitstream. FFT process 33C transforms the time domain signal into digital frequency domain representations, and clipping control process 34C restores separated words due to overflow, as noted above. FEQ and phase compensation process 35C flattens the signal spectrum of the received sequence, and compensates for phase distortion. Finally, decoding and deframing process 40C performs the inverse of the transmission sequence, including bit demapping and gain scaling, tone reordering and packing process, and deframing and flow control, resulting in a digital word that is applied to the host system via PC interface 9.

As shown in FIG. 1, central office modem 8 also includes multiple AFEs 12, preferably arranged in master/slave fashion among one another, each of which is in communication with one of twisted-pair facilities TWP, and thus with one of remote DSL modems 15 in a DSL session, as shown.

While many of the operations performed by AFEs 12 in central office modem 8 are similar to those performed by AFEs 11 in remote modems 15, certain differences arise therebetween because of the frequency differences in the ADSL technology, particularly in receive traffic at each location (receive traffic at central office modem 8 being at a substantially lower frequency than that received at remote modems 15, as noted above). As will be described in further detail hereinbelow relative to AFEs 12 in remote modems 15, frequency-dependent attenuation over twisted-pair facilities TWP especially affect high frequency traffic received at remote modems 15. This attenuation is taken into account by an equalizer function that is included within AFEs 12 of remote modems 15, according to the preferred embodiment of the present invention. In addition, it is contemplated that analog echo cancellation may not be required for AFEs 12 in central office modem 8, as its transmitted traffic will typically be at significantly higher frequencies than its received traffic. Of course, echo cancellation functionality may be provided within AFEs 12, if such is desired. In any event, these differences in functionality are reflected in the hardware realization of AFEs 11, 12.

Each of AFEs 12 in central office modem 8 is in communication with an associated line driver 14, which may be the same line driver circuit as described above relative to remote modems 15. Each of line drivers 14 is bidirectionally coupled to an associated four-wire to two-wire hybrid 16, for interfacing the modem to an associated twisted pair facility TWP.

The exemplary system illustrated in FIG. 1 is particularly well-suited for DSL communications, particularly ADSL communications where the upstream and downstream bandwidths differ from one another, including consideration of the stringent requirements of this technology. Particularly, the analog signal processing constraints presented by DSL communications, for example as stated in the T1E1.413 standard, require high performance filtering that heretofore have required discrete realizations of the AFEs. By way of explanation, the bandwidth of ADSL communications is quite large; in the exemplary embodiment, the downstream (central office to remote) signal bandwidth is 25 kHz to 1104 kHz, and the upstream (remote to central office) signal bandwidth is 25 kHz to 138 kHz. In addition, the subscriber loops will vary widely in length and quality, which necessitates the ADSL AFEs to have very large dynamic range (e.g., on the order of 100 to 102 dB) to accommodate as much of the potential loop population as possible. Overlaying of the DSL data communications with POTS conmmunications, with ring signals exceeding 100 volts, further complicates the analog processing by requiring that the DSL receivers must include a high-pass filter capable of tolerating these high voltages.

According to the preferred embodiment of the invention, as noted above, AFEs 11, 12 are realized by integrated circuits which execute all analog loop interface functions that are not exposed to high voltages, and in a manner which eliminates the need for complex analog filtering (which is not suitable for integration due to the need for extensive component trimming), but still meets the requirements.

Figure 4:
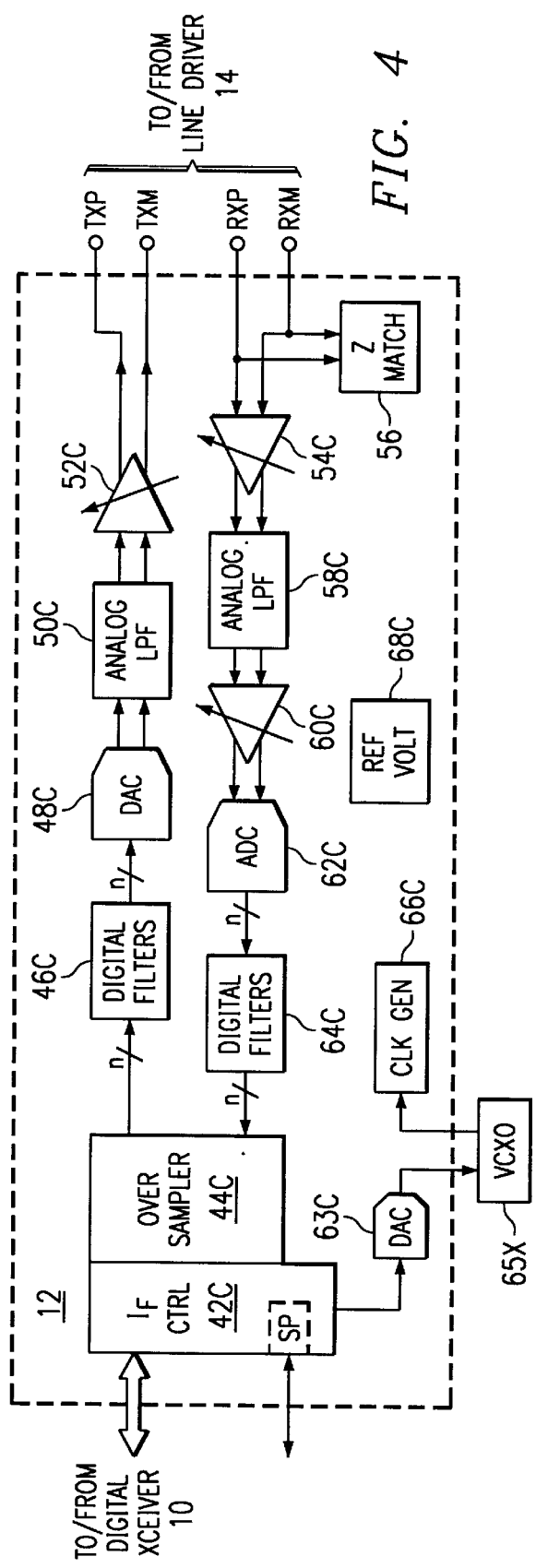
FIG. 4 is an electrical diagram, in block form, of the analog front end function in the central office DSL modem of the system of FIG. 1 according to the preferred embodiment of the invention.

Referring now to FIG. 4, the construction of AFE 12 in central office DSL modem 8, according to the preferred embodiment of the invention, will now be described in detail. As mentioned above, this construction enables AFE 12 to be integrated into a single integrated circuit, providing important advantages in the telecommunications carried out by the system of FIG. 1, including reduced cost, improved system reliability, and component matching. The integrated circuit of AFE 12 will be of the so-called "mixed-signal" type considering that both digital and analog processes are carried out thereby. Additional integration scale may, of course, be alternatively obtained by the integration of AFE 12 as described herein with either or both of digital transceiver function 10 or line driver 14, as appropriate for the available manufacturing technology.

AFE 12 includes a transmit side and a receive side, similar to digital transceiver function 10 described hereinabove. In this embodiment of the invention, the transmit and receive sides share interface and control function 42C, by way of which AFE 12 communicates with digital transceiver 10. Interface and control function 42C includes a parallel digital interface, by way of which digital words to be transmitted by central office modem 8 are received by AFE 12, and by way of which data received from twisted pair facility TWP and processed by AFE 12 are communicated as digital words to digital transceiver 10. According to the preferred embodiment of the invention, this parallel interface is a sixteen-bit parallel interface, with edge-triggered read and write strobe inputs for controlling the reading of data therefrom and writing of data thereto, respectively. Additionally, interface and control function 42C includes multiple control registers for storing control words that set the state of various functions in AFE 12, such as gain values for the various programmable amplifiers, switch control for the bypass or enable of various filter blocks and functions (as will be described hereinbelow), and in the case of AFE 12, for an input impedance matching function at the receiver end (also described in further detail hereinbelow).

Interface and control function 42C also includes the appropriate signal interface for receiving and providing control information from and to digital transceiver 10. In this embodiment of the invention, serial port SP is provided to receive control information such as used to set the frequency of clock signals, as will be noted below. Conventional scan testing, such as according to the JTAG standard, is also preferably implemented via interface and control function 42C.

Clock circuitry 66C is shared by the transmit and receive sides of AFE 12, and provides the corresponding clock control for synchronous operation thereof. According to the preferred embodiment of the present invention, clock circuitry 66C generates internal (and, if desired, external) clock signals based upon an external voltage controlled crystal oscillator (VCXO) 65X. In AFE 12, digital-to-analog converter (DAC) 63C is provided which, in response to control signals generated by interface and control function 42C (specifically via update signals applied to serial port SP therein), produces an analog voltage that is applied to, and thus controls, voltage controlled crystal oscillator 65X. DAC 63C, in a preferred implementation, is a 12-bit serial DAC, which provides suitable fine resolution for high-frequency (e.g., 35.328 MHz) VCXO 65X.

Voltage reference 68C, preferably a stable voltage reference circuit such as a bandgap reference, is also shared by the transmit and receive sides of AFE 12, and may be realized by conventional circuitry for establishing the necessary reference voltage levels for use in digital-analog conversion and analog-digital conversion operations, as well as in other components of AFE 12. Other circuitry used in the operation of AFE 12, including standard integrated circuit functions such as power supply distribution and regulation, general purpose port communications, and the like, may of course also be included therein, but is not shown for purposes of clarity of this description. AFE 12 also includes oversampling register 44C as shown in FIG. 4, which comprises one or more register stages, as may be used in both the transmit and receive sides of AFE 12 in realizing the digital filter operations which will be described hereinbelow.

Figure 5:
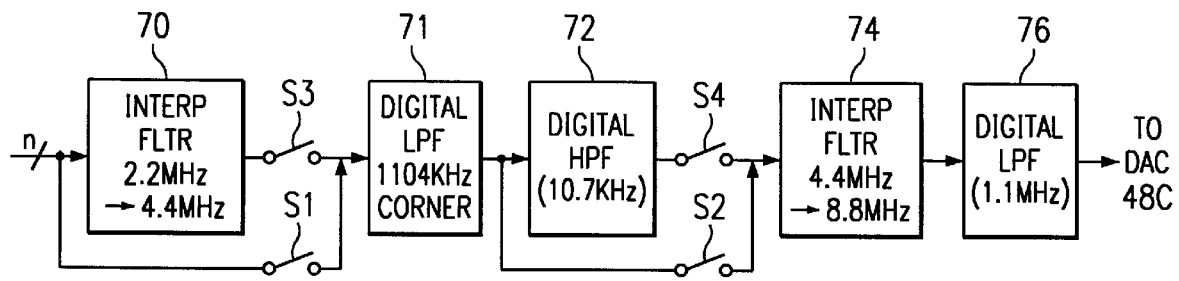
FIG. 5 is a flow diagram illustrating the digital filtering performed by the transmit side of the analog front end function of FIG. 4 according to the preferred embodiment of the invention.

Referring now to the transmit side of AFE 12, digital filters 46C receive digital data words from oversampling registers 44C, and implement digital filter operations upon these digital data words, prior to digital-to-analog conversion. Referring now to FIG. 5, the data flow through digital filters 46C, in combination with oversampling registers 44C, for the exemplary implementation of the preferred embodiment of the invention will now be described in detail.

As illustrated in FIG. 5, the digital filtering process executed by AFE 12 includes multiple options which are selectable by switches S1 through S4, depending upon the frequency and characteristics of the digital data provided by digital transceiver function 10. Interpolation filter 70 increases the sample rate by a factor of two, in order to provide an oversampled digital-to-analog conversion downstream. In this exemplary realization, the sample rate is increased from 2208 kHz to 4416 kHz, simply by loading one of oversampling registers 46C in an alternating manner, with zero-valued samples loaded between each input sample value; the output of oversampling registers 46C is sampled at a rate that is twice that at which the actual input samples are loaded into registers 46C. The insertion of zero-valued samples, rather than performing interpolation filter process 70 by simply twice sampling each loaded input sample value, provides the benefit of eliminating $$\cos\left[\frac{\pi f}{f_c}\right]$$

attenuation that may otherwise occur from oversampling. Alternatively, it is contemplated that $$\cos\left[\frac{\pi f}{f_c}\right]$$

attenuation may be compensated by IFFT process 22C in digital transceiver 10, if computational capacity for such compensation is available.

Digital low pass filter 71 is then applied to the incoming digital sample input values, whether or not interpolation filter process 70 is bypassed. Digital low pass filter 71 is provided to compensate for the gain loss that is incurred by the zero-insertion upsampling of process 70. Additionally, in the case where interpolation filter 70 is performed by the insertion of zero-valued samples, no $$\cos\left[\frac{\pi f}{f_c}\right]$$

attenuation is performed thereby; as such, digital low pass filter 71 will likely be necessary in order to reach the desired power spectral density (psd) roll-off specifications that are contemplated to be implemented for DSL communications. Regarding gain loss involved in interpolation filter 70, digital low pass filter 71 preferably provides a 6 dB gain if interpolation filter 70 is not bypassed, but a 0 dB gain if filter 70 is bypassed by switches S1, S3 being closed and open, respectively.

According to this preferred embodiment of the invention, digital low pass filter 71 is a thirty-three-tap finite impulse response (FIR) low-pass filter, with symmetric coefficient tap weights (for zero group delay distortion). In a preferred implementation, the b (i.e., feed-forward) coefficients $b_0$ through $b_{32}$ are as follows:

$$b_0 = b_4 = b_{28} = b_{32} = +\frac{1}{64}$$

$$b_1 = b_{31} = 0$$

$$b_2 = b_{30} = -\left(\frac{1}{64} + \frac{1}{256}\right)$$

$$b_3 = b_5 = b_{27} = b_{29} = -\left(\frac{1}{256} + \frac{1}{512}\right)$$

$$b_6 = b_9 = b_{23} = b_{26} = -\left(\frac{1}{64} + \frac{1}{128}\right)$$

$$b_7 = b_{25} = +\left(\frac{1}{128} + \frac{1}{512}\right)$$

$$b_8 = b_{24} = \frac{1}{32} - \frac{1}{256}$$

$$b_{10} = b_{22} = +\frac{1}{32}$$

$$b_{11} = b_{21} = \frac{1}{32} + \frac{1}{64}$$

$$b_{12} = b_{20} = +\frac{1}{32} + 1$$

$$b_{13} = b_{19} = -\left(\frac{1}{64} + \frac{1}{32}\right)$$

$$b_{14} = b_{18} = -\left(\frac{1}{32} + \frac{1}{128}\right)$$

$$b_{15} = b_{17} = \frac{1}{4} + \frac{1}{16}$$

$$b_{16} = \frac{1}{2} + \frac{1}{32} + \frac{1}{128}$$

Digital low pass filter 71 provides appropriate in-band psd in the 1104 to 2208 kHz band, according to current T1E1.413 standards.

Digital high pass filter 72 may next be performed by AFE 12 as part of filter block 46C of FIG. 4. Digital high pass filter 72 is preferably a first-order high pass filter, for example with a −3 dB corner frequency of 10.7 kHz, implemented by way of conventional digital filter design techniques as an infinite impulse response (IIR) filter. In an exemplary implementation, the total ripple resulting from filter 72 is approximately 0.55 dB over the bandwidth of 25 kHz to 1104 kHz, with a group delay varying from 1.7 μsec at 25 kHz to 1.7 nsec at 1104 kHz. Filter 72, when used in combination with a POTS splitter at the central office, satisfies the POTS-band interference specifications of the T1E1.413 standard.

Interpolation filter process 74 is another instance by way of which one or more of oversampling registers 46C increases the sample rate by a factor of two, again by inserting zero-valued samples between each actual digital input sample. In the instance of interpolation filter process 74, the appropriate one of oversampling registers 46C is loaded at 4416 kHz and its output sampled at 8832 kHz, resulting in a similar transfer function as indicated above for process 70, but with a different frequency $f_c$. As a result of interpolation filter processes 70, 74, the digital-to-analog conversion to be performed will be executed at an over-sampled rate, namely eight times the signal bandwidth, to ease the complexity of downstream analog filtering, as will be described hereinbelow.

Digital low pass filter process 76 is then applied to the oversampled output of interpolation filter process 74, to effect band-limiting on the digital data, also to ease the complexity of the downstream analog filtering. According to the preferred embodiment of the invention, digital low pass filter process 76 is realized by way of an FIR implementation with symmetric tap weights, which minimizes the overall delay distortion through AFE 12. A particularly advantageous realization of digital low pass filter 76 uses seven taps, and fourteen non-zero bits, which permits the multiplications to be implemented simply with a small number of shift and add circuits in AFE 12. In this example, the tap weights are set as follows:

$$b_0 = b_6 = -\frac{1}{32} - \frac{1}{128}, \quad b_1 = b_5 = -\frac{1}{64},$$

$$b_2 = b_4 = \frac{1}{4} + \frac{1}{32} + \frac{1}{64}, \quad b_3 = \frac{1}{2} + \frac{1}{128}$$

According to the preferred embodiment of the invention, and particularly for implementing a known standard such as the T1E1.413 standard, these power-of-two tap weight coefficients are preferably hard-wired into AFE 12. Alternatively, especially considering the rate at which telecommunications standards can change over time, AFE 12 may provide a register or other addressable location into which the number of taps, and the tap weight coefficients, may be made programmable. The output of digital low pass filter 76 is preferably multiplied by a value $$\left(2 - \frac{1}{64}\right),$$

so that its gain does not exceed 6 dB at any frequency. The result of digital low pass filter process 76 is then applied to digital-to-analog converter (DAC) 48C, as shown in FIG. 4.

As a result of digital high pass filter process 72, if used, and digital low pass filter 76, the complexity of downstream analog filtering is greatly reduced from that required by current DSL standards. While the stop-band requirements for the analog signal are not modified by digital filter processes 72, 74, the transition band characteristics are greatly eased, such that no additional attenuation is required at 1.5 MHz, and that only an attenuation of −4 dB at 3 MHz is necessary, in this implementation. This amount of filtering is relatively easy to implement with simple analog filtering, as will be discussed hereinbelow.

The state of switches S1 through S4 will be determined by control signals from digital transceiver 10 in this embodiment of the invention, depending upon the frequency at which the digital output is presented by digital transceiver 10. For example, if the output of digital transceiver function 10 is at 2208 kHz, switches S3 and 54 will be closed and switches S1 and S2 will be open, so that both interpolation filters 70, 74 and also digital high pass filter 72 are applied to the digital data. Alternatively, if the output of digital transceiver function 10 is already at 4416 kHz, switch S1 will be closed, switch S3 will be open, and switches S2, S4 will be open or closed depending upon whether the high pass filter of process 72 is necessary. This provides a significant degree of flexibility in the implementation of AFE 12.

Figure 6:
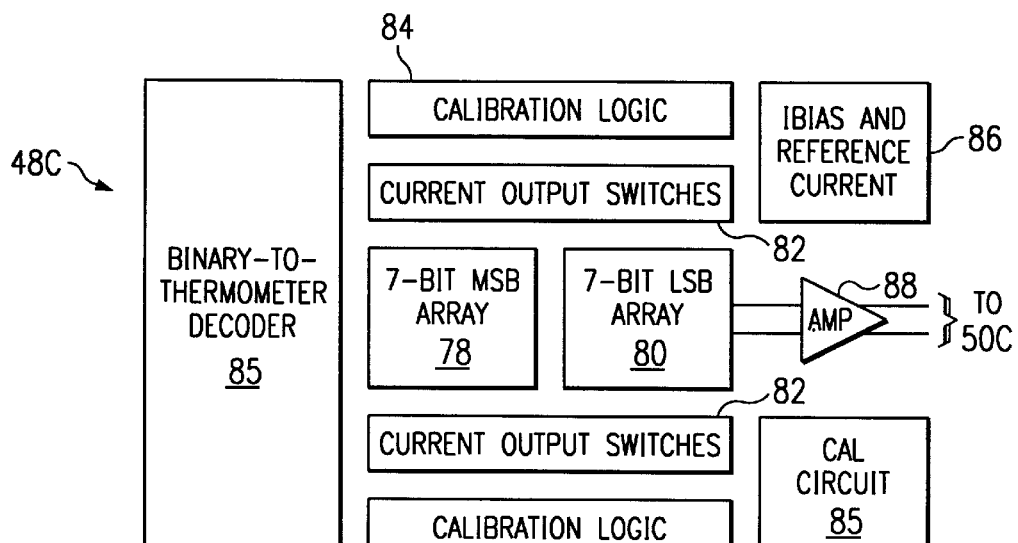
FIG. 6 is an electrical diagram, in block form, of the digital-to-analog converter in the transmit side of the analog front end function of FIG. 4 according to the preferred embodiment of the invention.

Referring back to FIG. 4, the filtered digital data is now applied to digital-to-analog converter (DAC) 48C. FIG. 6 illustrates an example of the construction of DAC 48C according to the preferred embodiment of the present invention. DAC 48C, according to the preferred embodiment of the present invention, is a 14-bit current steering architecture DAC which operates at 4× oversampling, for a conversion rate of 8832 kHz. According to the preferred embodiment of the invention, DAC 48C is realized by a 7-bit coarse subDAC MSB array 78, in combination with LSB array 80 which includes two time-interleaved 7-bit fine subDACs. Coarse MSB subDAC 78 consists of 128 PMOS cascode current sources, in combination with which the two fine subDACs in LSB subDAC array 80 form the cascodes of two additional calibrated PMOS current sources. All of the subDACs utilize a common centroid layout topology.

According to modern manufacturing technology, process control is contemplated as sufficient to guarantee the necessary linearity of the LSB DAC, but not of the MSB DAC; as such, the current sources of the subDACs of arrays 78, 80 are continuously calibrated via calibration circuit 85 and calibration logic 84. This calibration is carried out at a rate that is in the unused portion of the frequency spectrum between 4 kHz and 25 kHz, e.g., of 4.190 kHz, to avoid instability caused by a spurious tone at the calibration frequency while compensating for an estimated error due to charge leakage from the calibrated PMOS gate in each current source. This calibration technique is described in detail in D. W. J. Groeneveld, et al., "A Self-Calibration Technique for Monolithic High Resolution D/A Converters", *J. Solid State Circ.*, Vol. SC-24 (IEEE, December 1989), pp. 1517–1522. While this calibration is preferably made linear to the full 14-bit resolution of DAC 48C, the 7-bit subDACs in array 80 are only required to be linear to a 7-bit resolution.

DAC 48C includes current output switches 82, which switch the current sources of arrays 78, 80 either to amplifier 88 (DAC output) or to calibration circuit 85. The two fine subDACs in LSB subDAC array 80 form the cascodes of two additional calibrated PMOS current sources, and are time-interleaved so that one entire subDAC cascode can be switched into calibration circuit 85 while the other is connected to amplifier 88 at the DAC output. Further, both a spare MSB current source for MSB array 78 and both subDACs in LSB array 80 may be switched by current output switches 82 into a "hold" state, where current is switched neither to amplifier 88 nor to calibration circuit 85.

Binary-to-thermometer decoder 85 provides thermometer decoding for the coarse subDAC in array 78; the 7-bit fine subDACs in array 80 utilize a combination of five-bit thermometer and two-bit binary decoding from decoder 85, for a 5-2 segmented decode, for purposes of chip area reduction.

The output current from arrays 78, 80 is an integer multiple of a reference current generated in bias and reference circuitry 86. Reference current circuitry 86 converts a precision reference bandgap voltage into a reference current using an amplifier in unity-gain feedback configuration with output connected to a resistor. The connection made to complete the feedback loop in about the reference amplifier is digitally selectable at sixteen taps on the reference resistor. The digitally trimmed resistor in reference current circuitry 86 has a ±8% range selectable at 1% intervals. In addition, the reference resistors is preferably matched, with regard to process tolerances, relative to the feedback resistor in amplifier 88, to convert the DAC output current into an output voltage via resistive feedback. This matching allows the output voltage of DAC 48C to be a ratio of the resistors present in amplifier 88 and in reference current circuitry 86 so as to eliminate, to a first order, the dependence of the output voltage of DAC 48C upon the absolute value of these resistors. Remaining error mechanisms include the offset voltage of amplifier 88 and the inherent offset current between the reference and calibrated currents. These remaining offset errors contribute to a full-scale DAC gain error, requiring the ±8% trim range on the reference resistor to trim the gain of DAC 48C to within 1% of the desired value.

Because of this construction of DAC 48C, the output waveform is of the stair-step (zero-order-hold) type. The power-spectral-density (psd) of the output of DAC 48C is thus effectively modulated by a frequency response as follows:

$$\frac{\sin\left[\frac{\pi f}{f_c}\right]}{\left[\frac{\pi f}{f_c}\right]}$$

In this case, as noted above, sample frequency $f_c$ is 8832 kHz. This modulation insignificantly distorts the 1104 kHz pass-band; if desired, this distortion is precompensated in digital transceiver 10 during IFFT process 22C. In any event, the psd modulation provided at the output of DAC 48C provides some of the stop-band rejection that is otherwise required of the downstream analog filtering, thus reducing the complexity of such analog filters.

As shown in FIG. 4, the analog output of DAC 48C is applied to analog low-pass filter 50C. Analog low-pass filter 50C, according to the preferred embodiment of the present invention, is a third-order Chebyshev continuous-time filter, implemented according to conventional techniques, with a ripple preferably less than ±0.5 dB at the nominal 1.325 MHz passband. This relatively simple analog filter is enabled by the extent of the digital filtering previously provided by filters 46C in filter functions 72, 76 as discussed above.

Depending upon the particular psd specifications of the operative DSL standard, analog low-pass filter 50C may or may not be trimmable so as to meet the specifications over expected process variations. Of course, because of the integrated implementation of AFE 12, it is preferred that analog low-pass filter 50C be untrimmed, despite the variations in the corner frequency that may occur. However, given the current T1E1.413 "Issue II" standard, it is contemplated that the addition of one trimming bit (fuse) may be necessary in order for AFE 12 to meet the overall psd requirements.

Additionally, it has been observed that the worst case group delay presented by analog low pass filter 50C, which is at a corner frequency 40% lower than nominal, varies over frequency from about 285 nsec to about 655 nsec. This low group delay results directly from the low complexity of analog low pass filter 50C, which was enabled by the implementation of digital filters 46C discussed above. Combined with the worst case group delay presented by digital filters 46C, the overall worst case group delay through the transmit side of AFE 12 is approximately 1.78 μsec, which is suitable for DSL communications.

The output of analog low pass filter 50C is presented to programmable attenuator 52C, which is constructed according to conventional techniques. Programmable attenuator 52C provides 0 dB to −24 dB attenuation, selectable in 1 dB steps by way of a control word written to AFE 12 (for example into interface and control function 42C). The input referred noise as applied to programmable attenuator 52C is preferably on the order of −138 dBm/Hz so as not to degrade the signal-to-noise ratio of the output signal from DAC 48C; such a noise requirement is believed to be within the capability of current technology. The output of programmable attenuator 52C is presented on lines TXP, TXM to line driver 14, and corresponds to an analog signal corresponding to the data to be transmitted, encoded in the manner implemented by digital transceiver 10, and with the frequency characteristics specified by the applicable DSL standard, such as T1E1.413.

In the event that POTS traffic is to be conveyed over twisted pair wire facility TWP, the use of an external high-pass filter between AFE 12 and twisted pair wire facility TWP is preferred to remove POTS transients.

Referring now to the receive side of AFE 12, lines RXP, RXM are received from line driver 14 by programmable gain amplifier 54C. Programmable gain amplifier 54C preferably amplifies the incoming signal in a fine manner, from 0 dB to 3 dB in 1 dB steps, selectable by way of a control word. According to the preferred embodiment of the present invention, the input impedance of programmable gain amplifier 54C is adjusted by impedance matching circuit 56 to present a constant input impedance to line driver 14 at lines RXP, RXM, regardless of the selected gain of amplifier 54C, as will now be described relative to FIGS. 7 and 8.

Figure 7:
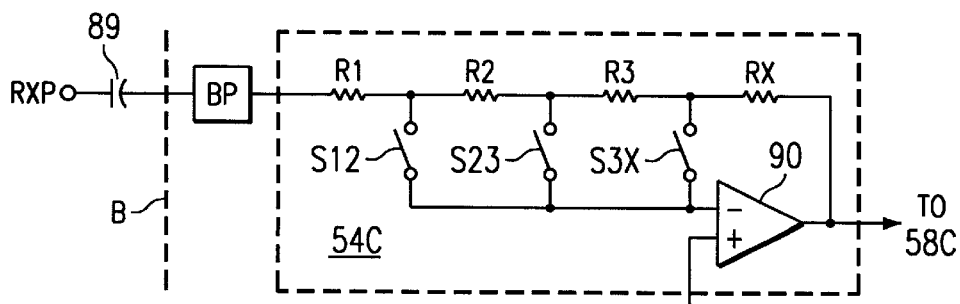
FIG. 7 is an electrical diagram, in block form, of a conventional programmable gain amplifier.

FIG. 7 illustrates programmable gain amplifier 54C, implemented in the conventional fashion. In this example, input line RXP is capacitively coupled to the integrated circuit (such as that constituting AFE 12) via external high-pass coupling capacitor 89 connected to bond pad BP of the integrated circuit (boundary B of FIG. 7 illustrating the chip boundary of the integrated circuit). Programmable gain amplifier 54C has its gain programmably set through operation of switches S12, S23, S3X, which are connected between the inverting input of operational amplifier 90 and nodes between resistors R1, R2, R3, RX, which are connected in series between the output of amplifier 90 and external coupling capacitor 89. The values of resistors R1, R2, R3, RX will typically vary among themselves, depending upon the range and resolution of programmable gain levels desired for amplifier 54C. The non-inverting input of amplifier 90 is biased to ground, and the output of amplifier 90 is forwarded to analog low pass filter 58C (FIG. 4); alternatively, amplifier 90 may be implemented as a differential amplifier, particularly where two lines are used to communicate analog signals as noted above (it being contemplated that those of ordinary skill in the art will be readily able to implement differential versions of the amplifier circuits which are described herein relative to single-ended inputs). The state of switches S12, S23, S3X determine the gain of programmable gain amplifier 54C, by setting the ratio between feedback and input resistance as seen by amplifier 90. As is fundamental in the art, the inverting gain of an operational amplifier is proportional to the ratio between the feedback resistance and the input resistance. For example, if switch S23 is closed and all other switches S12, S3X are open, the gain of programmable gain amplifier 54C will be proportional to $$\frac{RX + R3}{R1 + R2}.$$

Other combinations of switches S12, S23, S3X will select different ratios of feedback to input resistance and thus different gain. However, changes in the gain of programmable gain amplifier 54C will also change its high frequency behavior. Specifically, the high-pass filter established by external capacitor 89 of capacitance $C_{89}$ will have a pole determined by $$\frac{1}{R_{in}C_{89}},$$

where $R_{in}$ is the input resistance. These changes in high frequency operation will thus change the frequency response of the overall circuit.

Figure 8:
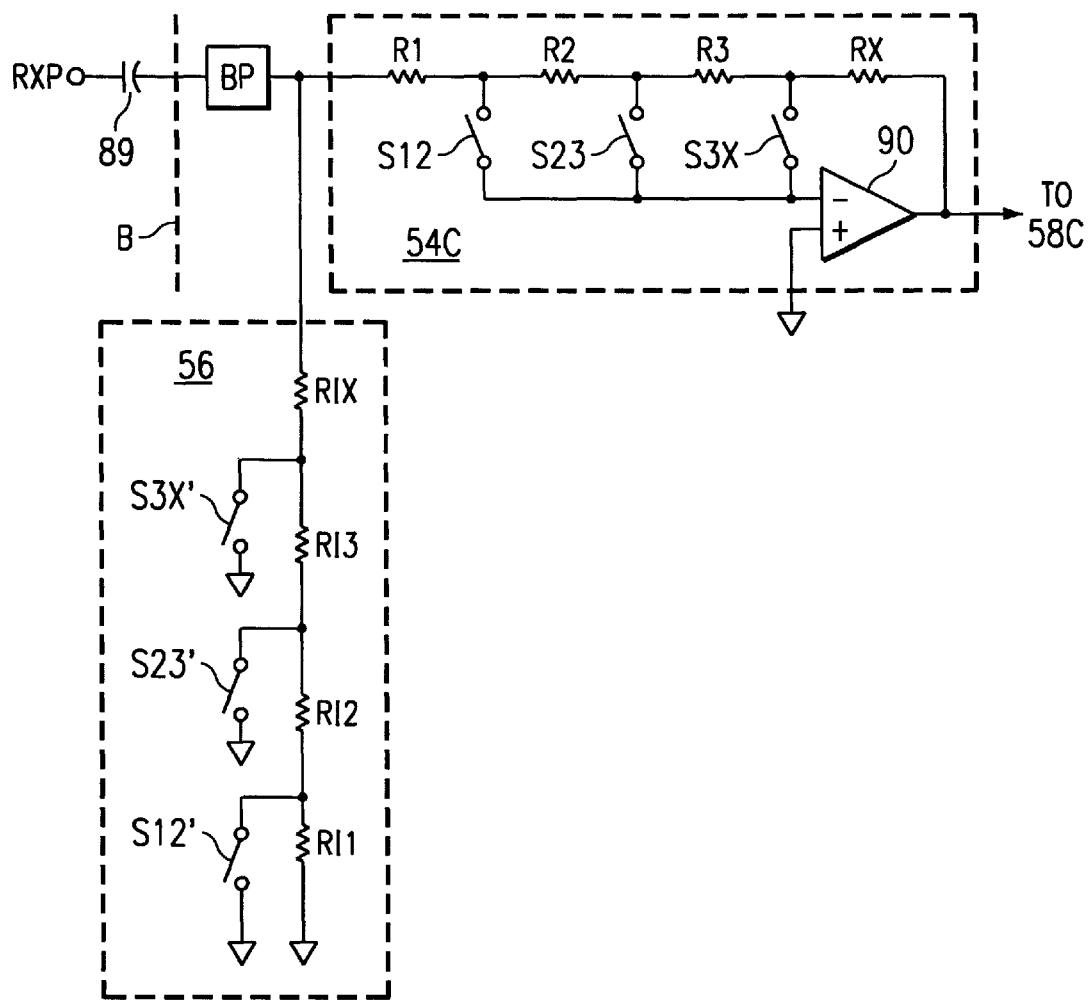
FIG. 8 is an electrical diagram, in block form, of a programmable gain amplifier in combination with an impedance matching circuit as used in the receive side of the analog front end function of FIG. 4 according to the preferred embodiment of the invention.

Referring now to FIG. 8, the implementation of programmable gain amplifier 54C in combination with impedance matching circuit 56, according to the preferred embodiment of the present invention, will now be described in detail. The construction and operation of programmable gain amplifier 54C remains as described above relative to FIG. 7. In the preferred embodiment of the invention as illustrated in FIG. 8, impedance matching circuit 56 is connected to external coupling capacitor 89, between bond pad BP and first input resistor R1 at the input of programmable gain amplifier 54C. Impedance matching circuit 56, in this embodiment of the invention, includes multiple resistors, connected in series between the input to programmable gain amplifier 54C and ground. Switches S3X', S23', S12' are connected between intermediate nodes of respective ones of resistors RIX, RI3, RI2, RI1 and ground, so that each of S3X', S23', S12', when closed, shorts out one or more of resistors RI3, RI2, RI1 in impedance matching circuit 56. According to the preferred embodiment of the invention, switches S3X', S23', S12' are controlled in tandem with switches S3X, S23, S12, respectively; for example, when switch S23 is closed and switches S3X, S12 are open, switch S23' will be closed and switches S3X', S12' will all be open.

The values of resistors RIX, RI3, RI2, RI1 are selected to correspond to the values of resistors R1, R2, R3, RX in such a manner as to maintain the input resistance presented at bond pad BP substantially constant over the available gain values. This is because the frequency response of the combination of programmable gain amplifier 54C and impedance matching circuit 56 will be proportional to:

$$\frac{1}{(R_{in}\|R_{56})C_{89}}$$

where $R_{56}$ corresponds to the resistance through impedance matching circuit 56 for a given selection of switches S3X', S23', S12'.

In the arrangement of FIG. 8, the input resistance presented at bond pad BP will be equal to the sum of the resistors R1, R2, R3 selected as input resistors to amplifier 90, in parallel with the corresponding ones of resistors RIX, RI3, RI2, RI1 that are in the series connection between bond pad BP and ground through impedance matching circuit 56. For example, if switches S23 and S23' are closed, with all other switches in programmable gain amplifier 54C and impedance matching circuit 56 open, the input resistance presented by programmable gain amplifier 54C will correspond to resistors R1, R2 in parallel with resistors RIX, RI3, or $$\frac{(R1 + R2)(RIX + RI3)}{(R1 + R2) + (RIX + RI3)}$$

Similarly, if switches S12 and S12' are closed, with all other switches open, the input resistance presented by the combination of programmable gain amplifier 54C and impedance matching circuit 56 will correspond to:

$$\frac{(R1 + R2)(RIX + RI3)}{(R1 + R2) + (RIX + RI3)}$$

One can readily set the values of resistors R1, R2, R3, RX, and resistors RIX, RI3, RI2, RI1 in such a manner as to minimnize the variation of input resistance over the available universe of selection for switches S3X', S23', S12'. For example, the following values of resistance for resistors R1, R2, R3, RX, and resistors RIX, RI3, RI2, RI1 will provide a relatively constant input impedance:

| R1 | R2 | R3 | RX | RI1 | RI2 | RI3 | RIX |
|---|---|---|---|---|---|---|---|
| 12965 Ω | 1550 Ω | 1732 Ω | 1960 Ω | 532 Ω | 425 Ω | 350 Ω | 6900 Ω |

Of course, it is contemplated that those of ordinary skill in the art will be readily able to similarly realize programmable gain amplifier 54C in combination with impedance matching circuit 56 with different resistance values, according to particular realizations.

Because of the implementation of impedance matching circuit 56, the gain of programmable gain amplifier 54C can be programmably selected based upon the particular characteristics of the subscriber loop currently in communication with central office modem 8 within which AFE 12 according to the preferred embodiment of the invention is realized, without altering the input impedance presented by AFE 12 to line driver 14 and the remainder of the system. Accordingly, the response of AFE 12 to received signals is greatly improved by the implementation of impedance matching circuit 56.

Referring back to FIG. 4, the output of programmable gain amplifier 54C is presented to analog low pass filter 58C, followed by amplification by programmable gain amplifier 60C and analog-to-digital conversion by analog-to-digital converter (ADC) 62C. In this system on the receive side of AFE 12, analog low pass filter 58C is provided primarily to avoid aliasing corruption of the low frequency signal band (DC to 138 kHz). Analogously as described above relative to analog low pass filter 50C, analog low pass filter 58C may be implemented as a relatively simple analog filter, such as a third order Chebyshev filter realized as an active RC network in the conventional manner, with 6.0 dB pass-band gain, and a corner frequency of about 155 kHz. Preferably, given the integration of AFE 12 into an integrated circuit, polysilicon resistors and poly-to-poly capacitors are used in analog low pass filter 58C, despite the sensitivity of these components to process variations. Trimming may be used in the manufacture of AFE 12 to adjust analog low pass filter 58C; however, such trimming only to an accuracy of ±13% variation in the corner frequency is necessary, given the presence of digital filters 64C downstream from analog low pass filter 58C as will be described hereinbelow. According to the preferred embodiment of the invention, such trimming is enabled by way of multiple parallel capacitors, for example in the feedback loop of operational amplifier circuits, and which may be selectably switched into or out of the circuit; as is known in the art, the control of such switches may be effected by logic functions controlled by the state of fuses at their inputs.

In this exemplary implementation, the source of signal that may be aliased into the received signal, at these frequencies, is that which is generated by the transmit side of AFE 12 itself; as noted above, the transmit side of AFE 12 will be generating signals spanning the band from 25 kHz to 1104 kHz, with a psd that varies between −52 dBm/Hz to −40 dBm/Hz, depending upon hybrid performance. The worst case situation arises when the return loss through hybrid 16 in central office modem 8 is low but where the loop attenuation is high, resulting in the echo power from the transmit side of AFE 12 to be high relative to the received signal power from remote modem 15 over twisted pair facility TWP. In this situation, AFE 12 is preferably controlled so that the gain of programmable gain amplifiers 54C (in combination with a coarse programmable gain amplifier within line driver 14) is set to produce signal power in a range of from −2.44 dBm to −1.44 dBm at the input to analog low pass filter 58C. Assuming that return loss through hybrid 16 is frequency-independent, this gain corresponds to −61.75 dBm/Hz in the transmitted signal band of 30 to 1104 kHz, rolling off by −24 dB/octave after 1104 kHz. As will be noted hereinbelow, ADC 62C samples at a rate of 4416 kHz in this exemplary embodiment, such that the low end of the aliased band at ADC 62C is at 2208 kHz; the above gain combination results in a psd at 2208 kHz of −85.75 dBm/Hz. Considering that the attenuation provided at 2208 kHz by analog low pass filter 58C according to the preferred embodiment of the invention is at least −65 dB, and even considering a 5.5 dB gain provided by programmable gain amplifier 60C, the psd above 2208 kHz at the input of ADC 62C is at most −145.25 dBm/Hz, substantially eliminating aliasing distortion, as this level is at least −9 dB below the quantization noise of ADC 62C according to this embodiment of the invention. The group delay presented by analog low pass filter 58C according to this embodiment of the invention is expected to vary from on the order of 2.3 μsec to 5.25 μsec over the pass band, resulting in a distortion of about 3 μsec overall.

The gain required to bring the signal level to −1.44 dBm in this worst case, where the received upstream signal is much smaller than the echo from hybrid 16, is contemplated to be so large (e.g., on the order of 9 dB) as to saturate analog low pass filter 58C if significant upstream signal is present due to a short loop, or if echo power is reduced because of return loss through hybrid 16, since this signal is entirely within the pass band of filter 58C. As such, programmable gain amplifier 54C would have its gain downwardly adjusted in this circumstance.

As noted above, the output of analog low pass filter 58C is applied to a second programmable gain amplifier 60C which, in this example, provides a gain ranging from about 2.5 dB to about 5.5 dB in 1 dB steps, and provides an output signal voltage swing of about 4 volts peak-to-peak. The output of second programmable gain amplifier 60C is applied to ADC 62C.

ADC 62C in this embodiment of the invention converts the received analog signal into digital words at a fixed sample rate of 4416 kHz, with 14-bit resolution. Conventional ADC implementations may be used for ADC 62C according to this embodiment of the invention. Linearity is preferably maximized by trimming during manufacture. Reference voltage circuit 68C preferably applies a stable reference voltage, such as a bandgap voltage, to ADC 62C, to provide a highly accurate conversion over temperature.

Figure 9:
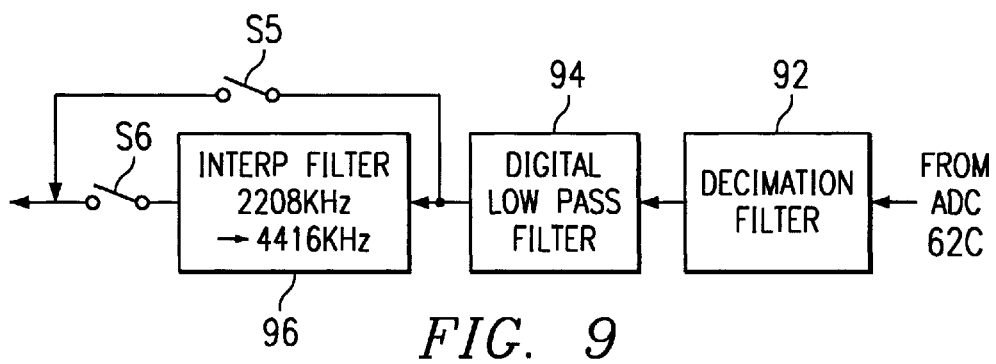
FIG. 9 is a flow diagram illustrating the digital filtering performed by the receive side of the analog front end function of FIG. 4 according to the preferred embodiment of the invention.

The output of ADC 62C is applied to digital filters 64C. Referring now to FIG. 9, the signal flow through digital filters 64C, in combination with oversampling registers 44C, will now be described in detail. As illustrated in FIG. 9, decimation filter process 92 is first applied to the digital data from ADC 62C, in order to reduce the sample rate and thus reduce the complexity of the downstream digital FIR low pass filter 94. In this embodiment of the invention, the sample rate of ADC 62C is 4416 kHz, as noted above; decimation filter process 92 implements a four-tap FIR with all four taps having the same value of 0.25. The resulting modulation of decimation filter process 92 is:

$$0.25 \exp\left(-j3\pi \frac{f}{f_c}\right) \frac{\sin\left(4\pi \frac{f}{f_c}\right)}{\sin\left(\pi \frac{f}{f_c}\right)}$$

The sample rate reduction provided by decimation filter process 92 aliases the portion of the output spectrum of ADC 62C above 1104 kHz into the DC to 1104 kHz band. This reduced rate digital stream is then applied to digital low pass filter 94.

Digital low pass filter 94, in this embodiment of the invention, is an FIR digital filter that is operating at a sample rate that is twice the output spectrum of decimation filter 92, or 2208 kHz in this example. The decimation provided by decimation filter process 92 reduces the complexity of digital low pass filter 94, enabling its implementation as a 13-tap FIR filter with symmetric tap weights (rather than a 25-tap filter with 53 non-zero tap weight bits), thus greatly reducing the complexity of filter 94 and facilitating its realization in the integrated circuit of AFE 12, even considering the chip area required for decimation filter process 92.

The transfer function realized by digital low pass filter 94 is preferably determined as a tradeoff between pass-band ripple and stop-band rejection, while still maintaining low complexity. In this regard, one may assume that the processing implemented by digital transceiver function 10 in its receive side, as discussed above, will decimate the signal sample rate to on the order of 276 kHz, and cancel echo components up to at least 414 kHz, which defines the frequencies to be filtered by digital low pass filter to begin at about 414 kHz. According to the preferred embodiment of the invention, digital low pass filter 94 has a corner frequency of about 414 kHz, with stop-band rejection of on the order of −32 dB. Of course, if the echo psd is lower, or the signal psd higher, than the worst case, or if the echo cancellation implemented by digital transceiver function 10 extends to a higher frequency, the stop band rejection requirements for digital low-pass filter 94 are eased.

According to the preferred embodiment of the invention, digital low-pass filter function 94 implements a 13-tap FIR filter that may be realized simply as a collection of registers and adders (i.e., without a dedicated multiplier), due to the selection of the tap weight coefficients to involve a small number of non-zero bits. The complexity of digital low pass filter 94 is instead determined by the number of non-zero bits in its tap weight coefficients which, in this exemplary embodiment, are no more than twenty-seven, given the following selection of tap weight coefficients:

$$b_0 = b_{12} = -\frac{1}{128}$$

$$b_1 = b_{11} = -\frac{1}{32} - \frac{1}{64}$$

$$b_2 = b_{10} = -\frac{1}{128}$$

$$b_3 = b_9 = \frac{1}{32} + \frac{1}{64}$$

$$b_4 = b_8 = \frac{1}{8} + \frac{1}{64} + \frac{1}{128}$$

$$b_5 = b_7 = \frac{1}{4} - \frac{1}{64} + \frac{1}{128}$$

$$b_6 = \frac{1}{4} + \frac{1}{64} + \frac{1}{128}$$

According to the preferred embodiment of the invention, these tap weight coefficients may be hard-wired into digital filter 64C for the particular standard (e.g., T1E1.413). Alternatively, and particularly where the DSL standards are expected to be fluid, digital filters 64C may be implemented in such a manner that the number of taps and their tap weight coefficients are programmably selectable; of course, the complexity of the circuitry required for such programmability will necessarily increase.

The output of digital low pass filter function 94 is applied to interpolation filter 96, or bypassed via operation of switches S5, S6 as shown in FIG. 9. In this embodiment of the invention, interpolation filter 96 is implemented by oversampled registers 44C, with the output sampled at twice the frequency (e.g., 4416 kHz) at which digital low pass filter 94 loads the same (e.g., 2208 kHz). The determination of whether to utilize interpolation filter 96 depends upon the desired sample input rate of digital transceiver 10.

According to the preferred embodiment of the present invention, AFE 12 in central office modem 8 may be realized in a single integrated circuit, due to the reduced complexity of the analog filters 50C, 58C, such reduced complexity enabled by the provision of digital filters 46C, 64C. Furthermore, according to the preferred embodiment of the present invention, the digital filtering performed by digital filters 46C, 64C in the digital domain of AFE 12 can be realized by FIR filters, using tap weight coefficients that involve relatively few non-zero bits, in order to facilitate the realization of AFE 12 in a sinigle integrated circuit. The ability to integrate these functions, along with the significant reduction in required component trimming in manufacture, greatly reduces the cost of the analog front-end function in DSL modems, and also improves the overall system performance.

Figure 10:
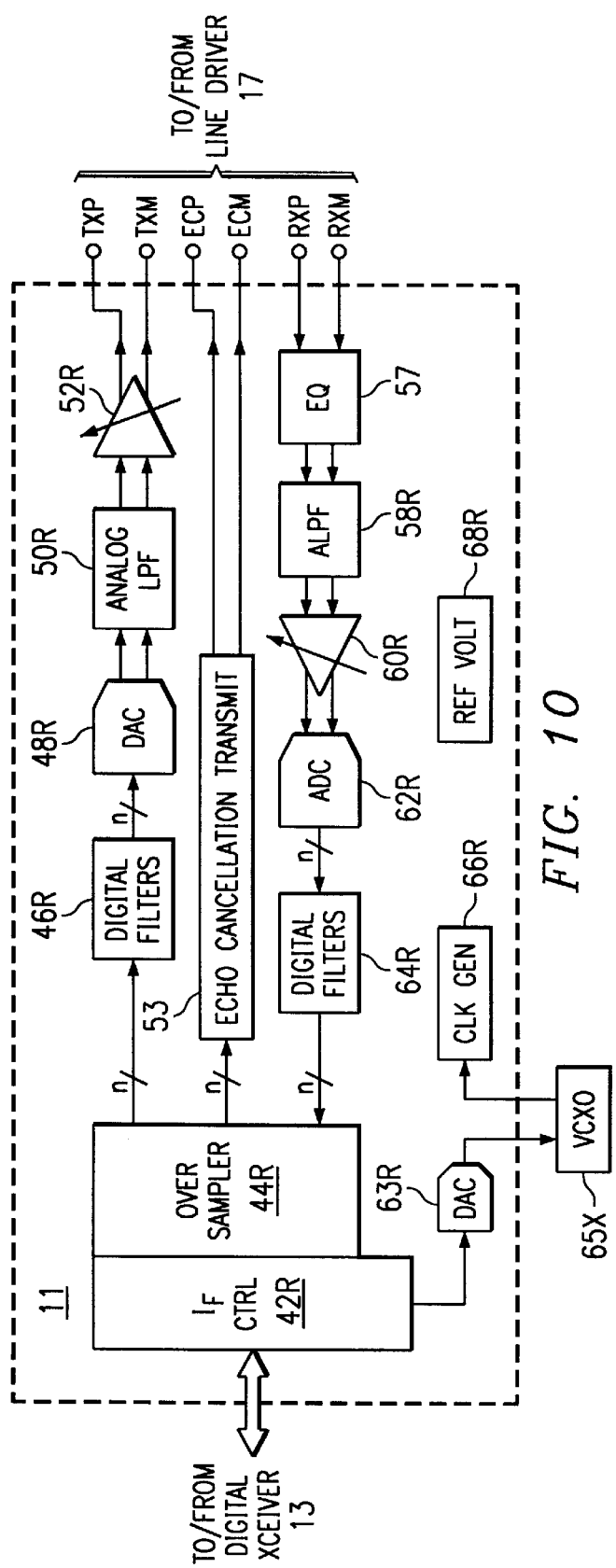
FIG. 10 is an electrical diagram, in block form, of the analog front end function in the remote DSL modem of the system of FIG. 1 according to the preferred embodiment of the invention.

Referring now to FIG. 10, the construction and operation of AFE 11 in remote modems 15 will now be described in detail. As was the case with AFE 12 in central office modem 8, it is contemplated that AFE 11 may be readily integrated into a single integrated circuit, either limited to its functions or alternatively integrated with certain of the other functions such as digital transceiver function 13, line driver 17, and the like. As will be evident from the following description, the functionality of AFE 11 is quite similar to that of AFE 12 described hereinabove, to the extent that AFE 11 and AFE 12 may be implemented on a common integrated circuit, with metallization selection or fuse progranmming used to determine, for a given integrated circuit, whether it is to serve as remote AFE 11 or a central office AFE 12.

As in the case of AFE 12, AFE 11 according to this embodiment of the present invention is intended to provide all loop interface components that are not exposed to high voltages, such as a high-pass filter, transmitter power driver, four-wire to two-wire hybrid, and a receiver coarse programmable gain amplifier, such elements being external to AFE 11 (e.g., implemented within line driver 17 and hybrid 19).

As in the case of AFE 12, AFE 12 includes a transmit side and a receive side. Additionally, a second transmit side 53 is provided in AFE 12, which is identical to the signal transmit side illustrated in FIG. 10, for purposes of providing time domain echo cancellation. In this regard, echo cancellation transmit side 53 drives lines ECP, ECM with analog signals corresponding to those generated by AFE 11 on lines TXP, TXM; lines ECP, ECM are applied to the line receiver externally from AFE 12 (e.g., at line driver 17), to provide a scaled copy of the low-frequency upstream transmit signal that can be used to cancel any echo signal generated by the transmit side of AFE 11.

In this embodiment of the invention, the transmit (both primary and echo cancellation transmit side 53) and receive sides share interface and control function 42R, by way of which AFE 11 communicates with digital transceiver 13. As before, interface and control function 42R includes a parallel digital interface, by way of which digital words to be transmitted by remote modem 15 are received by AFE 11, and by way of which data received from twisted pair facility TWP and processed by AFE 11 are communicated as digital words to digital transceiver 13. According to the preferred embodiment of the invention, this parallel interface is a sixteen-bit parallel interface, with edge-triggered read and write strobe inputs for controlling the reading of data therefrom and writing of data thereto, respectively. Additionally, interface and control function 42R includes multiple control registers for storing control words that set the state of various functions in AFE 11, such as gain values for the various programmable amplifiers, switch control for the bypass or enable of various filter blocks and functions (as will be described hereinbelow), and in the case of AFE 11, for setting the gain of a receive equalizer function (also described in further detail hereinbelow).

Interface and control function 42R also includes the appropriate signal interface for receiving and providing control information from and to digital transceiver 13. In this embodiment of the invention, serial port SP is provided to receive control information such as used to set the frequency of clock signals, as will be noted below. Conventional scan testing, such as according to the JTAG standard, is also preferably implemented via interface and control function 42R.

Clock circuitry 66R is shared by the transmit and receive sides of AFE 11, and provides the corresponding clock control for synchronous operation thereof. According to the preferred embodiment of the present invention, clock circuitry 66R generates internal (and, if desired, external) clock signals based upon an external voltage controlled crystal oscillator (VCXO) 65X. As discussed hereinabove relative to AFE 12, 12-bit serial digital-to-analog converter (DAC) 63R in AFE 11 produces an analog control voltage that is applied to external voltage controlled crystal oscillator 65X, in response to control signals received by interface and control function 42R (specifically via update signals applied to serial port SP therein).

Voltage reference 68R, preferably a stable voltage reference circuit such as a bandgap reference, is also shared by the transmit and receive sides of AFE 11. The other circuitry used in the operation of AFE 11, such as power supply distribution and regulation, general purpose port communications, and the like, may of course also be included therein, but is not shown for purposes of clarity of this description. As shown in FIG. 10, AFE 11 also includes oversampling register 44R which comprises one or more register stages, as may be used in AFE 11 in realizing the digital filter operations which will be described hereinbelow.

Figure 11:
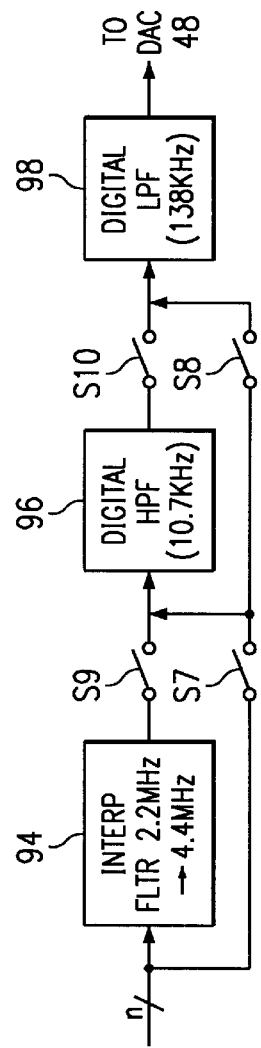
FIG. 11 is a flow diagram illustrating the digital filtering performed by the transmit side of the analog front end function of FIG. 10 according to the preferred embodiment of the invention.

Referring now to the signal transmit side of AFE 11, digital filters 46R receive digital data words from oversampling registers 44R, and implement digital filter operations upon these digital data words, prior to digital-to-analog conversion. Referring now to FIG. 11, the data flow through digital filters 46R, in combination with oversampling registers 44R, for the exemplary implementation of the preferred embodiment of the invention will now be described in detail.

As illustrated in FIG. 11, the digital filtering process executed by AFE 11 includes multiple options, which are selectable by switches S7 through S10, depending upon the frequency and characteristics of the digital data provided by digital transceiver function 10. Interpolation filter 94, as in AFE 12, increases the sample rate by a factor of two, (e.g., from 2208 kHz to 4416 kHz) simply by loading one of oversampling registers 46R at half the rate that the output is sampled. As noted above, this operation realizes a filter with a transfer function of $1+z^{-1}$, and involves zero group delay distortion. Because of the relatively low frequencies of these signals (maximum signal frequency being 138 kHz), modulation arising from this filter is insignificant.

Digital high pass filter 96 may next be performed by AFE 12, as part of filter block 46R of FIG. 4. As in the case of AFE 12, digital high pass filter 72 is preferably a first-order high pass filter, for example with a −3 dB corner frequency of 10.7 kHz, implemented by way of conventional IIR digital filter design techniques. The characteristics of digital high pass filter 96 in AFE 11 are preferably similar to those described hereinabove for digital high pass filter 72 in AFE 11.

Digital low pass filter process 98 is then applied to the digital signal (to the extent filtered by functions 94, 96), to effect band-limiting on the digital data so as to ease the complexity of the downstream analog filtering. It has been observed, according to the present invention, that the analog filtering of upstream DSL communications can be reduced from a fourth order analog filter to a second order analog filter through use of digital low pass filter 98; noise contribution of downstream analog filtering is also reduced, as well. According to the preferred embodiment of the invention, digital low pass filter process 98 is realized by way of an infinite impulse response (IIR) implementation with a corner frequency at about 138 kHz. A particularly advantageous realization of digital low pass filter 98 is a third order IIR filter that approximates an elliptic response with minimal (±0.5 dB) pass-band ripple. A preferred exemplary realization utilizes a time-domain filter equation as follows:

$$y(n)=a_1 y(n-1)+a_2 y(n-2)+a_3 y(n-3)+b_1 x(n-1)+b_2 x(n-2)+b_3 x(n-3)$$

where the coefficients are defined as follows:

$$b_1=b_3=2^{-7}-2^{-10}$$

$$b_2=-2^{-7}+2^{-10}$$

$$a_1=2+2^{-1}+2^{-3}+2^{-4}-2^{-8}-2^{-11}$$

$$a_2=-2-2^{-1}+2^{-4}$$

$$a_3=2^{-1}+2^{-2}-2^{-9}$$

This particular implementations deviates from the ideal digital elliptic filter to a slight extent, in order to reduce circuit complexity by maintaining coefficients that have relatively few non-zero bits, and which thus may be implemented without multipliers. This deviation has been observed to result only in a 0.25 dB droop at the corner frequency, which is tolerable in this application. Even considering the IIR implementation of digital low pass filter 98 in this embodiment of the invention, the group delay varies from only about 2.21 $\mu$sec (at 25 kHz) to 3.76 $\mu$sec (at 138 kHz).

According to the preferred embodiment of the invention, and particularly for implementing a known standard such as the T1E1.413 standard, these tap weight coefficients are preferably hard-wired into AFE 11. Alternatively, especially considering the rate at which telecommunications standards can change over time, AFE 11 may provide a register or other addressable location into which the number of taps, and the tap weight coefficients, may be made programmable. The result of digital low pass filter process 98 is then applied to digital-to-analog converter (DAC) 48R, as shown in FIG. 10. According to the preferred embodiment of the invention, the construction of DAC 48R according to the preferred embodiment of the present invention is substantially similar as that described hereinabove for DAC 48C, relative to FIG. 6, to which attention is directed.

As shown in FIG. 10, the analog output of DAC 48R is applied to analog low-pass filter 50R. Analog low-pass filter 50R, according to the preferred embodiment of the present invention, is a second-order Chebyshev continuous-time filter, implemented according to conventional techniques, having a nominal 166 kHz passband. This relatively simple analog filter is enabled by the extent of the digital filtering previously provided by filters 46R in filter functions 96, 98 discussed above. Because of the integrated implementation of AFE 11, it is preferred that analog low-pass filter 5OR be untrimmed, despite the variations in the corner frequency that may occur. It is contemplated, assuming typical process variations in modem manufacturing technology, that the resulting 40% variations in pass-band corner frequency about the nominal corner frequency of 166 kHz will satisfy the ripple specification over the 138 kHz signal band at the worst case.

Additionally, it has been observed that the worst case group delay presented by analog low pass filter 50R, which is at a corner frequency 40% lower than nominal, varies over frequency from about 1.14 $\mu$sec to about 1.82 $\mu$sec. This low group delay results directly from the low complexity of analog low pass filter 50R, which was enabled by the implementation of digital filters 46R discussed above, which is suitable for DSL communications.

The output of analog low pass filter 5OR is presented to programmable attenuator 52R, which is constructed according to conventional techniques. Similarly as described hereinabove for AFE 12, programmable attenuator 52R provides 0 dB to −24 dB attenuation, selectable in 1 dB steps by way of a control word written to AFE 11. As before, the input referred noise as applied to programmable attenuator 52R is preferably on the order of −138 dBm/Hz so as not to degrade the signal-to-noise ratio of the output signal from DAC 48R. The output of programmable attenuator 52R is presented on lines TXP, TXM to line driver 17, and corresponds to an analog signal corresponding to the data to be transmitted, encoded in the manner implemented by digital transceiver 13, and with the frequency characteristics specified by the applicable DSL standard, such as T1E1.413.

Referring now to the receive side of AFE 11, lines RXP, RXM, which are driven by line driver 17 in response to communication signals received over twisted pair facility TWP from central office modem 8, are received by equalizer 57. According to the preferred embodiment of the invention, equalizer 57 is provided to compensate for line attenuation over twisted pair facility TWP, particularly at the higher frequencies at which downstream data are communicated in ADSL technology.

Figure 12:
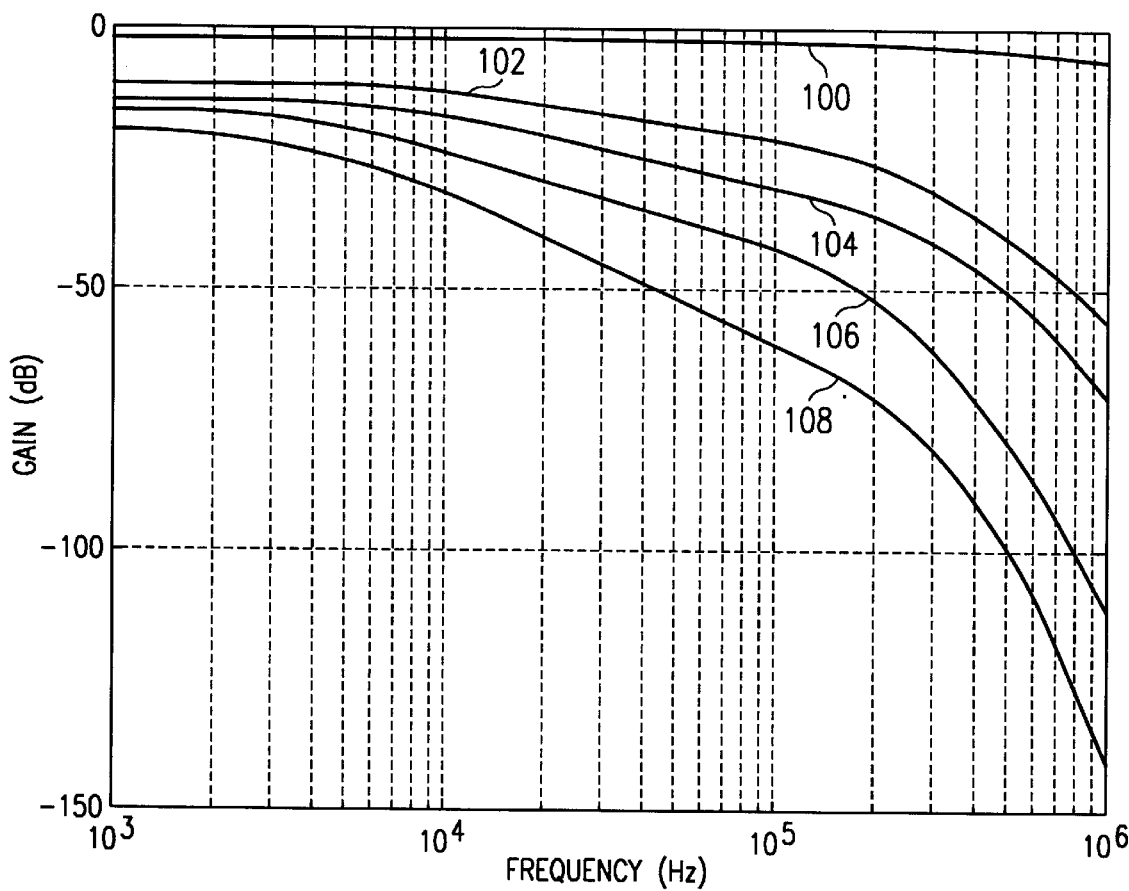
FIG. 12 is a plot of line attenuation over frequency for various twisted pair facility wire gages and lengths.

In particular, as noted above, the bandwidth over which downstream communication is carried out in this ADSL technology is between 25 kHz and 1.104 MHz. When signals over this wide bandwidth are applied to a conventional twisted pair telephone line, such as twisted pair facility TWP, significant attenuation can often occur. This attenuation is exacerbated with decreasing wire gage, with increasing wire length, and with increasing signal frequency. FIG. 12 plots the attenuation for various lengths and gage of wire, as shown by curves 100, 102, 104, 106, 108. Curves 100, 102, 106 illustrate the line attenuation for 1000 feet, 9000 feet, and 18,000 feet, respectively, of 24 AWG twisted pair wire; curves 104, 108 illustrate the line attenuation for 9000 feet and 18,000 feet, respectively, of 26 AWG twisted pair wire. As is evident from FIG. 12, line attenuation can be quite severe in some cases; for example, a 1 MHz signal will be attenuated up to on the order of −100 dB when applied to 18,000 feet of 24 AWG twisted pair wire. On the receiving end of such signals, however, conventional analog-to-digital converters typically have a quantization noise floor which is substantially flat over frequency. As a result, higher frequency signals communicated over conventional twisted pair facilities can be attenuated, by the transmission line, to such a degree as to fall below the quantization noise floor of the receiving ADC, in which case signals in the higher frequency portion of the bandwidth are lost.

FIG. 12 illustrates that the line attenuation characteristics can be approximated by two complex poles. According to the preferred embodiment of the invention, frequency domain equalizer 57 is provided in AFE 11 which boosts the signals at higher frequencies, according to a characteristic having two dominant zeroes. Preferably, the frequency characteristic of equalizer 57 is controllable in order to compensate for the wide variations in line condition, loop length and quality, and the like, especially considering that the noise requirements for the receive side of AFE 11 are quite stringent according to the current ADSL standards (e.g., on the order of 5 nV/$\sqrt{Hz}$). The use of switched-capacitor stages was contemplated for such equalization according to the preferred embodiment of the invention, but was observed to involve excessively large capacitors, and unrealistically low noise and high settling speed operational amplifiers, to realize according to modern technology. Accordingly, it was discovered, in connection with the present invention, that a continuous-time implementation of equalizer 57 is preferred, with RC-op amp realizations preferred (relative to gm-C and MOSFET-C realizations) given the low distortion level requirements of ADSL communications. Additionally, the compensation for such line attenuation by way of equalizer 57 is especially necessary to be included in the analog domain, prior to the analog-to-digital conversion performed by ADC 62R.

Figure 13:
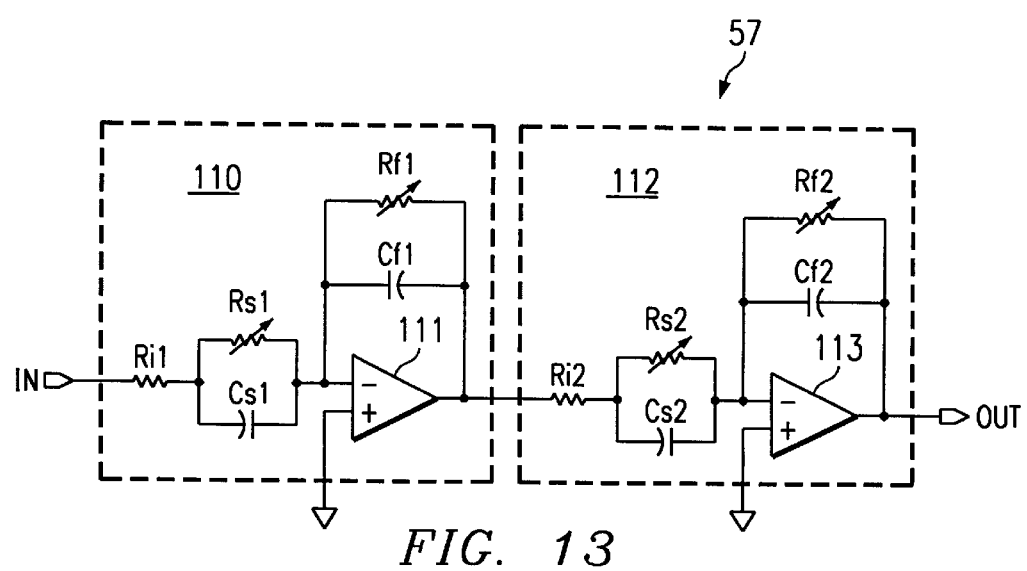
FIG. 13 is an electrical diagram, in schematic form, of an equalizer used in the receive side of the analog front end function of FIG. 10 according to a first preferred embodiment of the invention.

FIG. 13 illustrates the construction of equalizer 57 according to a first embodiment of the present invention, in which two operational amplifier stages 110, 112 are connected in cascade fashion. Stages 110, 112 include operational amplifiers 111, 113, respectively, each of which have an input RC network and a feedback RC network. For example, stage 110 includes an input RC network of resistor Ri1 in series with a parallel RC network of variable resistor Rs1 and capacitor Cs1, and a feedback parallel RC network of variable resistor Rf1 and capacitor Cf1; stage 112 is similarly arranged. As a result, the frequency response of equalizer 57 may be stated:

| Setting | Rs1 | Cs1 | Rf1 | Cf1 | Rs2 | Cs2 | Rf2 | Cf2 |
|---|---|---|---|---|---|---|---|---|
| 5 dB | 10 kΩ | 19 pF | 10 kΩ | 16 pF | 15 kΩ | 19.6 pF | 10 kΩ | 4 pF |
| 10 dB | 15 kΩ | 19 pF | 10 kΩ | 2 pF | 20 kΩ | 19.6 pF | 10 kΩ | 4 pF |
| 15 dB | 25 kΩ | 19 pF | 10 kΩ | 2 pF | 20 kΩ | 22.4 pF | 10 kΩ | 4 pF |
| 20 dB | 30 kΩ | 19 pF | 10 kΩ | 2 pF | 30 kΩ | 24 pF | 10 kΩ | 4 pF |
| 25 dB | 40 kΩ | 19 pF | 10 kΩ | 2 pF | 40 kΩ | 24 pF | 10 kΩ | 4 pF |

$$\left[ G_{111} \frac{\left(1 + \frac{s}{\omega_{110s}}\right)}{\left(1 + \frac{s}{\omega_{110i}}\right)\left(1 + \frac{s}{\omega_{110f}}\right)} \right] \left[ G_{113} \frac{\left(1 + \frac{s}{\omega_{112s}}\right)}{\left(1 + \frac{s}{\omega_{112i}}\right)\left(1 + \frac{s}{\omega_{112f}}\right)} \right]$$

where $G_{111}$, $G_{113}$ are the gains of amplifiers 111, 113, respectively, defined by the ratio of the feedback resistance to the input resistance. For example, gain $G_{111}$ is the ratio $$\frac{Rf1}{Ri1 + Rs1}$$

The characteristic transfer function frequencies $\omega_{110x}$, $\omega_{112x}$ for stages 110, 112, respectively, are defined as (for stage 110 by way of example):

$$\omega_{110s} = \frac{1}{Rs1 \cdot Cs1}$$

$$\omega_{110i} = \frac{Ri1 + Rs1}{Rs1 \cdot Cs1 \cdot Ri1}$$

$$\omega_{110f} = Rf1 \cdot Cf1$$

This transfer function thus provides two dominant zeroes, one from each stage, and each of which can be easily controlled by the product Rs·Cs for a particular stage. The two poles of the transfer function can be placed at appropriate frequencies to attenuate out of band response.

While equalizer 57 in this embodiment of the present invention includes two stages, finer control over the transfer function may be obtained through the use of more than two such stages. In such a case, the number of product terms in the transfer function will, of course, correspond to the number of stages utilized in equalizer 57.

Figure 14:
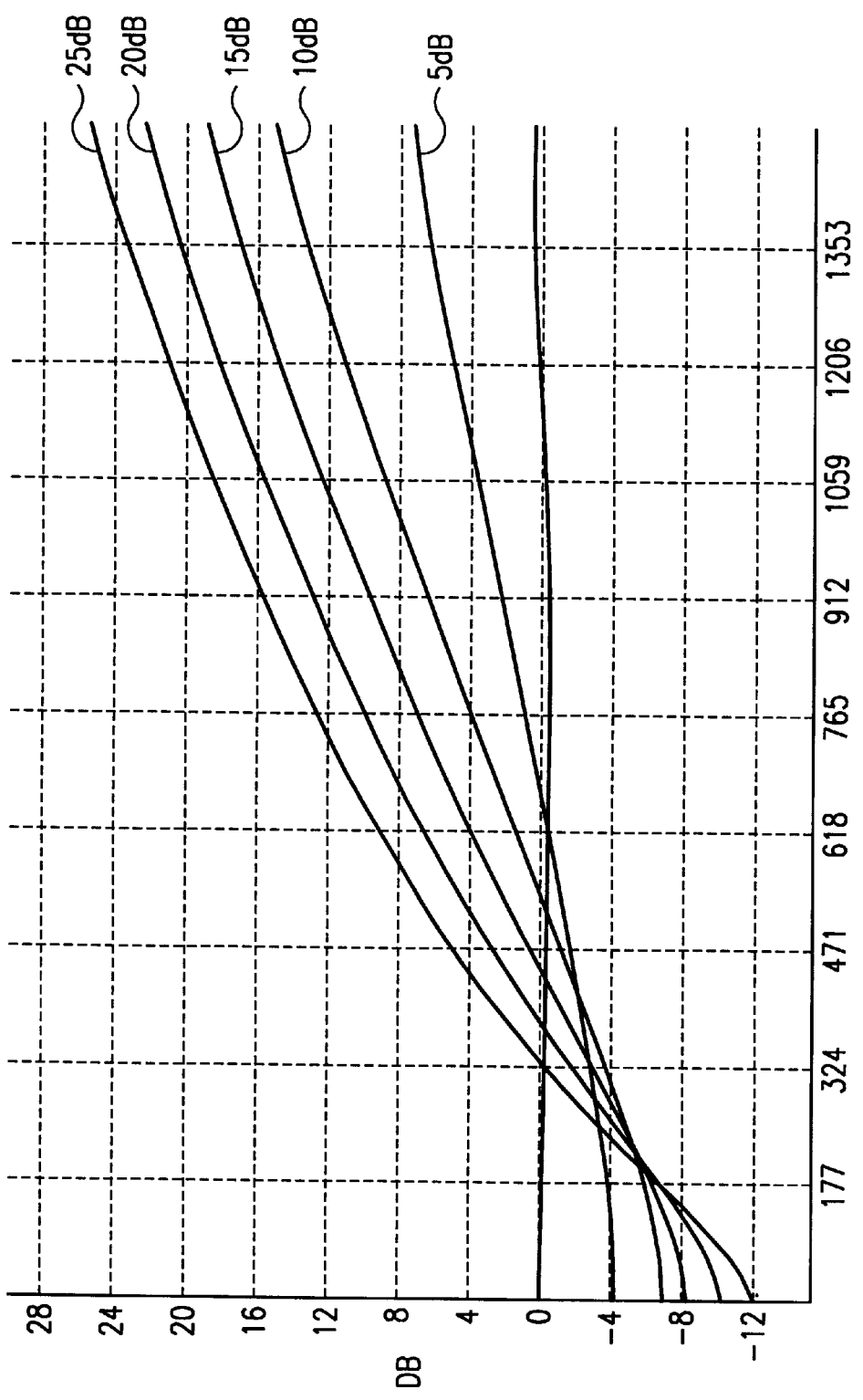
FIG. 14 is a plot of the transfer function of the equalizer of FIG. 13 at various settings.

As noted above, the locations of the dominant zeroes of equalizer 57 are preferably optimized so as to compensate for line attenuation over an expected range of loop conditions, by selecting a gain level over frequency. For example, it is contemplated that one may select a boost slope that varies with frequency (i.e., more boost at higher frequencies), ranging from 5 dB to 25 dB in 5 dB increments. With reference to FIG. 13, it is therefore preferable that each of variable resistors Rs1, Rf1, Rs2, Rf2 are implemented by way of a set of parallel resistors, each of which may be either enabled or disabled through the opening of switches to set the gain for each of stages 110, 112; alternatively, of course, the zeroes may be set by fixed resistor values according to design. Further in the alternative, referring to FIG. 10, switches (not shown) may be inserted into AFE 11 so that equalizer 57 is totally bypassed, with lines RXP, RXM applied directly to analog low pass filter 58R. In the preferred embodiment of the invention, the following is an exemplary RC table for various settings in the above-noted example:

This example assumes that resistors Ri1, Ri2 are each 500Ω. FIG. 14 illustrates the frequency response of equalizer 57 over frequency, for the above settings. As is evident therefrom, the high frequency boost provided by equalizer 57 compensates for the line attenuation over twisted pair facility TWP. According to the preferred embodiment of the invention, equalizer 57 is relatively simple to implement, and involves minimal group delay distortion (e.g., on the order of 1.96 μsec).

Referring back to FIG. 10, the output of equalizer 57 is applied to analog low pass filter 58R. Analog low-pass filter 58R, according to this embodiment of the present invention, is a fourth order elliptic continuous-time filter having a nominal 1.325 MHz pass band. As described hereinabove, analog low pass filter 58R may be untrimmed, despite the resulting effects on corner frequency due to process variations. The worst case group delay through analog low pass filter 58R is contemplated to be about 2.1 μsec. Alternatively, improved process control may be obtained by way of trimming either the resistors or capacitors in stages 110, 112.

Figure 15:
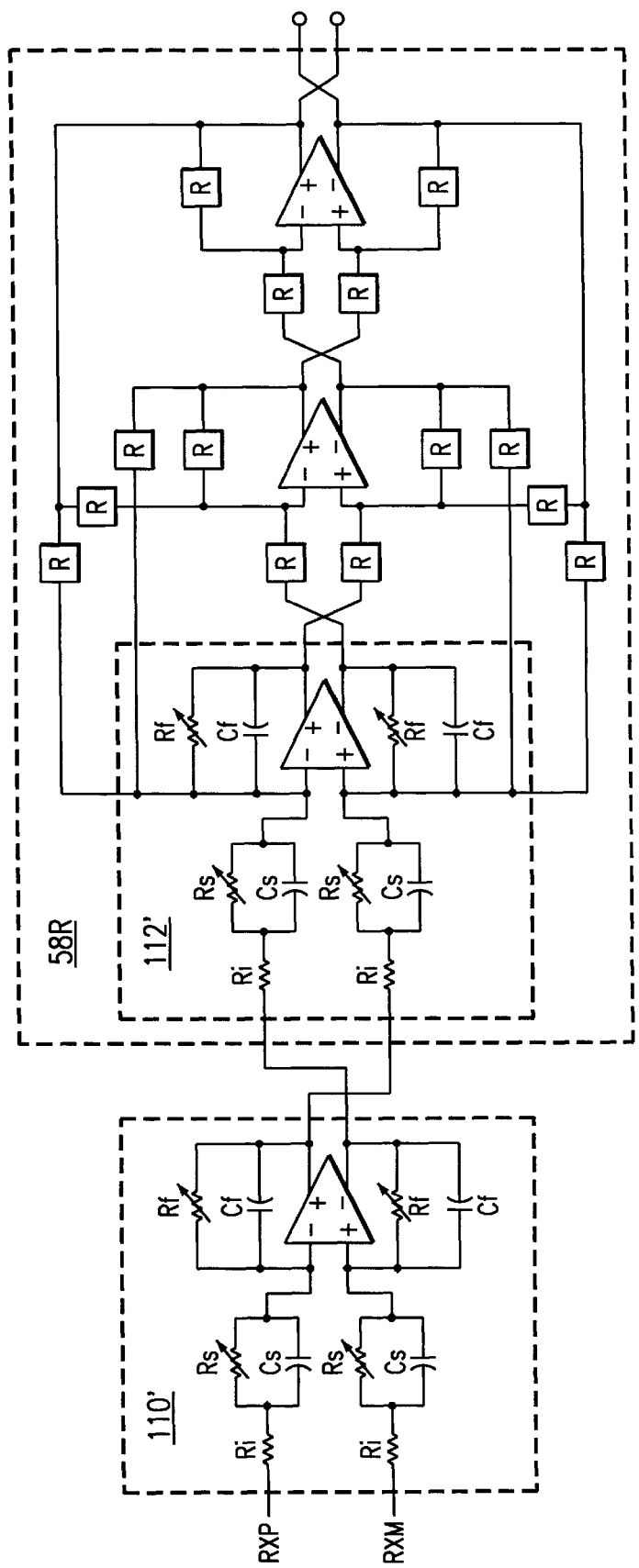
FIG. 15 is an electrical diagram, in schematic form, of an equalizer used in the receive side of the analog front end function of FIG. 10 according to a second preferred embodiment of the invention.

According to an alternative embodiment of the invention, analog low-pass filter 58R is implemented by a ladder filter, having multiple operational amplifier stages, and in which the first one of the multiple stages also serves as the second stage of equalizer 57. FIG. 15 illustrates such an arrangement, as will now be described in detail.

As shown in FIG. 15, each of stages 110', 112', as well as the remaining stages in analog low pass filter 58R, are realized in a differential fashion, receiving lines RXP, RXM. Resistors Rs and Rf associated with each of the inverting and non-inverting inputs are variable resistors in both of stages 110', 112', to provide selectable equalizer gain as described above. However, for purposes of stability of analog low pass filter 58R, it may be preferred to not adjust the values of resistors Rs and Rf in stage 112', so that the filter characteristics do not vary with the selection of gain for equalizer 57; with reference to the above table, it is contemplated that a wide range of gains may be obtained without varying the resistor values in second stage 112'. As evident from FIG. 15, analog low pass filter 58R is implemented in conventional fashion for active filters, with negative feedback from each operational amplifier in filter 58R being provided to each of the prior stages, including stage 112'.

According to this alternative embodiment of the invention, stage 112' serves both as a second stage in equalizer 57 and also as a first stage in analog low-pass filter 58R. Because stage 112' is necessary in analog low-pass filter 58R in order to obtain the proper order filter, this duplicate use enables equalizer 57 to be implemented simply by the addition of a single operational amplifier stage 110'. As a result, this embodiment of the present invention provides the additional advantage of being even more efficiently implemented into the integrated circuit of AFE 11. The overall noise and distortion of the channel is also minimized by the addition of the single stage, providing still further improvement in the performance of AFE 11.

Referring back to FIG. 10, the output of analog low pass filter 58R is applied to programmable gain amplifier 60R which, in this example, provides a frequency independent gain over the signal bandwidth of 25 kHz to 1104 kHz ranging from about 2.5 dB to about 11.5 dB in 0.25 dB steps, providing a maximum output signal voltage swing of about 4 volts peak-to-peak. The output of second programmable gain amplifier 60R is applied to ADC 62R.

ADC 62R in this embodiment of the invention converts the received analog signal into digital words at a fixed sample rate of 4416 kHz, with 14-bit resolution. Conventional ADC implementations may be used for ADC 62R according to this embodiment of the invention. Linearity is preferably maximized by trimming in manufacturing. Reference voltage circuit 68R preferably applies a stable reference voltage, such as a bandgap voltage, to ADC 62R, to provide a highly accurate conversion over temperature.

Figure 16:
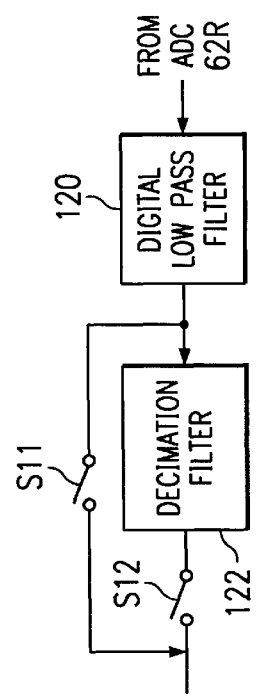
FIG. 16 is a is a flow diagram illustrating the digital filtering performed by the receive side of the analog front end function of FIG. 10 according to the preferred embodiment of the invention.

The output of ADC 62R is applied to digital filters 64R. Referring now to FIG. 16, the signal flow through digital filters 64R, in combination with oversampling registers 44R, will now be described in detail. As illustrated in FIG. 16, digital low pass filter function first performs a two-pole, two-zero biquadratic section sampling at the sample output rate of ADC 62R, which is 4416 kHz in this example. Digital low pass filter 120 is provided primarily to attenuate noise generated by equalizer 57 and analog low-pass filter 58R above 1104 kHz, so that aliasing from these frequencies does not occur when the sample rate is decimated to 2208 kHz. The transfer function of digital low pass filter 120 according to the preferred embodiment of the present invention is:

$$\frac{1+z^{-1}+z^{-2}}{2+\frac{z^{-1}}{4}+z^{-2}}$$

The stop band rejection above 1312 kHz for such a filter is about 8.8 dB, according to an exemplary implementation of digital low pass filter 120.

Decimation filter process 122 is then applied to the filtered data from digital low pass filter 120, if desired (i.e., if enabled by switches S11, S12). Decimation filter process 122 is provided to reduce the sample rate if desired by digital transceiver function 13. In this example, decimation filter process 122 is simply a two-sample running average circuit with a transfer function of:

$$0.5(1+z^{-1}) = \frac{1}{2}e^{-j\pi f/f_c}\cos\left(\frac{\pi f}{f_c}\right)$$

where $f_c$ is the input sample rate of 4416 kHz. While decimation filter process 122 causes a slight droop in the pass-band, such a droop is either tolerable, or may be compensated by FFT process 22R in digital transceiver function 13.

The overall group delay in the receive side of AFE 11 is expected to range from on the order of 0.92 μsec to on the order of 2.28 μsec, depending upon the setting selected for equalizer 57. This group delay is sufficiently small as to involve minimal distortion in the receive signal.

AFE 11 according to the present invention, similarly as AFE 12 described hereinabove, thus provides important advantages in the implementation of high-performance modems of the DSL type, by being realized in a single integrated circuit, enabled by the reduced complexity of the analog filters 50R, 58R, such reduced complexity enabled by the provision of digital filters 46R, 64R. Furthermore, according to the preferred embodiment of the present invention, AFE 11 provides the ability of selectable compensation for a wide range of line attenuation conditions, through the use of equalizer 57. As noted above, according to a specific implementation of the present invention, the equalizer function may be implemented with only a single operational amplifier stage, thus minimizing chip area cost and also added noise due to the additional process. As noted above, the ability to so integrate these functions that is enabled by the present invention to, along with the significant reduction in required component trimming in manufacture, greatly reduces the cost of the analog front-end function in DSL modems, and also improves the overall system performance.

While the present invention has been described according to its preferred embodiments, it is of course contemplated that modifications of, and alternatives to, these embodiments, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

I claim:

1. A receive equalizer circuit, comprising:
    a first stage, comprising:
       a first operational amplifier, having an input and an output;
       a first input impedance network, coupled between an input of the receive equalizer circuit and the input of the first operational amplifier, having an impedance selected from one of a first plurality of input impedance values to define a first dominant zero in a frequency characteristic of the receive equalizer circuit, and comprised of a capacitor and a variable resistance connected in parallel with the capacitor; and
       a first feedback impedance network, coupled between the output and the input of the first operational amplifier, and having an impedance selected from one of a first plurality of feedback impedance values and that is comprised of a capacitor and a variable resistance connected in parallel with the capacitor; and
    a second stage, comprising:
       a second operational amplifier, having an input, and an output;
       a second input impedance network, coupled between the output of the first operational amplifier and the input of the second operational amplifier, to define a second dominant zero in the frequency characteristic of the receive equalizer circuit; and
       a second feedback impedance network, coupled between the output and the input of the second operational amplifier;
    wherein each of the variable resistances comprise a plurality of resistors connected in parallel with one another, each of the plurality of resistors capable of being selectably enabled and disabled.

2. The receive equalizer circuit of claim 1, wherein the second input impedance network has an impedance selected from one of a second plurality of input impedance values; and wherein the second feedback impedance network has an impedance selected from one of a second plurality of feedback impedance values.

3. The receive equalizer circuit of claim 2, wherein each of the second input impedance network and second feedback impedance network comprise:
- a capacitor; and
- a variable resistance connected in parallel with the capacitor.

4. A receive equalizer circuit, comprising:
- a first stage, comprising:
  - a first operational amplifier having a non-inverting input and an inverting input, and a non-inverting output and an inverting output;
  - a first input impedance network, coupled between a first input of the receive equalizer circuit and the inverting input of the first operational amplifier, and having an impedance selected from one of a first plurality of input impedance values; and
  - a first feedback impedance network coupled between the non-inverting output and the inverting input of the first operational amplifier, and having an impedance selected from one of a first plurality of feedback impedance values; and
- a second stage, comprising:
  - a second operational amplifier, having an input, and an output;
  - a second input impedance network, coupled between the output of the first operational amplifier and the input of the second operational amplifier; and
  - a second feedback impedance network, coupled between the output and the input of the second operational amplifier;
- a third input impedance network, coupled between a second input of the receive equalizer circuit and the noninverting input of the first operational amplifier, and having an impedance selected from one of a third plurality of input impedance values; and
- a third feedback impedance network, coupled between the inverting output and the noninverting input of the first operational amplifier, and having an impedance selected from one of a third plurality of input impedance values.

5. The receive equalizer circuit of claim 4, wherein the second operational amplifier has a non-inverting input and an inverting input, and a non-inverting output and an inverting output;
- wherein the inverting output of the first operational amplifier is coupled to the inverting input of the second operational amplifier through the second input impedance network;
- wherein the second feedback impedance network is coupled between the non-inverting output and the inverting input of the second operational amplifier;
- and further comprising:
  - a fourth input impedance network, coupled between a second input of the receive equalizer circuit and the noninverting input of the first operational amplifier; and
  - a fourth feedback impedance network, coupled between the inverting output and the noninverting input of the first operational amplifier.

6. The receive equalizer circuit of claim 5, wherein the fourth input impedance network has an impedance selected from one of a fourth plurality of input impedance values; and wherein the second feedback impedance network has an impedance selected from one of a second plurality of feedback impedance values.

7. A receive equalizer circuit, comprising:
- a first stage, comprising:
  - a first operational amplifier, having an input and an output;
  - a first input impedance network, coupled between an input of the receive equalizer circuit and the input of the first operational amplifier, and having an impedance selected from one of a first plurality of input impedance values; and
  - a first feedback impedance network, coupled between the output and the input of the first operational amplifier, and having an impedance selected from one of a first plurality of feedback impedance values; and
- a second stage, comprising:
  - a second operational amplifier, having an input, and an output;
  - a second input impedance network, coupled between the output of the first operational amplifier and the input of the second operational amplifier; and
  - a second feedback impedance network, coupled between the output and the input of the second operational amplifier; and
- a ladder filter, having a plurality of operational amplifier stages, and having an input coupled to the output of the first operational amplifier;
- wherein the second stage serves as a first one of the plurality of operational amplifier stages of the ladder filter.

8. An analog front end circuit for a modem, integrated into a single integrated circuit, and comprising:
- a digital interface, for communication of digital signals;
- a digital-to-analog converter, coupled to the digital interface, for converting digital signals received from the digital interface into analog signals;
- a transmit filter, for filtering the analog signals into a first transmit frequency band;
- a receive equalizer for amplifymg the received analog signals according to a frequency response, comprising:
  - a first stage, comprising:
    - a first operational amplifier, having an input and an output;
    - a first input impedance network, for applying received analog signals, in a first receive frequency band, to the input of the first operational amplifier, and having an impedance selected from one of a first plurality of input impedance values; and
    - a first feedback impedance network, coupled between the output and the input of the first operational amplifier, and having an impedance selected from one of a first plurality of feedback impedance values; and
  - a second stage, comprising:
    - a second operational amplifier, having an input, and an output;
    - a second input impedance network, coupled between the output of the first operational amplifier and the input of the second operational amplifier; and
    - a second feedback impedance network, coupled between the output and the input of the second operational amplifier;
- an analog-to-digital converter, coupled to the receive analog filter, for converting the filtered analog signals into digital signals; and
- a receive digital filter, coupled to the analog-to-digital converter, for applying a digital filter function to the converted digital signals, and having an output coupled to the digital interface.

9. The analog front end circuit of claim 8, further comprising:
a receive analog filter, coupled to the output of the receive equalizer, for filtering analog signals amplified by the receive equalizer.

10. The analog front end circuit of claim 9, wherein the receive analog filter comprises a plurality of operational amplifier stages;
and wherein the second stage of the receive equalizer corresponds to a first one of the plurality of operational amplifier stages of the receive analog filter.

11. The analog front end circuit of claim 8, wherein each of the first input impedance network and first feedback impedance network comprise:
a capacitor; and
a variable resistance connected in parallel with the capacitor.

12. The analog front end circuit of claim 11, wherein each of the variable resistances comp rise a plurality of resistors connected in parallel with one another, each of the plurality of resistors being selectably enabled and disabled.

13. The analog front end circuit of claim 8, wherein the second input impedance network has an impedance selected from one of a second plurality of input impedance values;
and wherein the second feedback impedance network has an impedance selected from one of a second plurality of feedback impedance values.

14. The analog front end circuit of claim 8, wherein the analog signals are received on first and second differential inputs;
wherein the first operational amplifier has a non-inverting input and an inverting input, and a non-inverting output and an inverting output;
wherein the first differential input is coupled to the inverting input of the first operational amplifier through the first input impedance network;
wherein the first feedback impedance network is coupled between the non-inverting output and the inverting input of the first operational amplifier;
and further comprising:
a third input impedance network, coupled between the second differential input and the noninverting input of the first operational amplifier, and having an impedance selected from one of a third plurality of input impedance values; and
a third feedback impedance network, coupled between the inverting output and the noninverting input of the first operational amplifier, and having an impedance selected from one of a third plurality of input impedance values.

15. The analog front end circuit of claim 14, wherein the second operational amplifier has a non-inverting input and an inverting input, and a non-inverting output and an inverting output;
wherein the inverting output of the first operational amplifier is coupled to the inverting input of the second operational amplifier through the second input impedance network;
wherein the second feedback impedance network is coupled between the non-inverting output and the inverting input of the second operational amplifier;
and further comprising:
a fourth input impedance network, coupled between a second input of the receive equalizer circuit and the noninverting input of the first operational amplifier; and
a fourth feedback impedance network, coupled between the inverting output and the noninverting input of the first operational amplifier.

16. The analog front end circuit of claim 8, wherein the first receive frequency band includes frequencies higher than frequencies within the first transmit frequency band.

17. A digital subscriber line modem, comprising:
a host interface;
a digital transceiver function coupled to the host interface;
an analog line driver, for driving and receiving analog signals over a telephone facility; and
an analog front end circuit, integrated into a single integrated circuit, and comprising:
a digital interface, for communication of digital signals;
a digital-to-analog converter, coupled to the digital interface, for converting digital signals received from the digital interface into analog signals;
a transmit filter, for filtering the analog signals into a first transmit frequency band;
a receive equalizer for amplifying the received analog signals according to a frequency response, comprising:
a first stage, comprising:
a first operational amplifier, having an input and an output;
a first input impedance network, for applying received analog signals, in a first receive frequency band, to the input of the first operational amplifier, and having an impedance selected from one of a first plurality of input impedance values; and
a first feedback impedance network, coupled between the output and the input of the first operational amplifier, and having an impedance selected from one of a first plurality of feedback impedance values; and
a second stage, comprising:
a second operational amplifier, having an input, and an output;
a second input impedance network, coupled between the output of the first operational amplifier and the input of the second operational amplifier; and
a second feedback impedance network, coupled between the output and the input of the second operational amplifier;
an analog-to-digital converter, coupled to the receive analog filter, for converting the filtered analog signals into digital signals; and
a receive digital filter, coupled to the analog-to-digital converter, for applying a digital filter function to the converted digital signals, and having an output coupled to the digital interface.

18. The modem of claim 17, wherein the digital transceiver function comprises a programmable digital signal processor.

19. The modem of claim 17, wherein the first receive frequency band includes frequencies higher than frequencies within the first transmit frequency band.

20. The modem of claim 17, further comprising:
a receive analog filter, coupled to the output of the receive equalizer, for filtering analog signals amplified by the receive equalizer.

21. The modem of claim 20, wherein the receive analog filter comprises a plurality of operational amplifier stages;
and wherein the second stage of the receive equalizer corresponds to a first one of the plurality of operational amplifier stages of the receive analog filter.

22. The modem of claim 17, wherein each of the first input impedance network and first feedback impedance network comprise:
   a capacitor; and
   a variable resistance connected in parallel with the capacitor.

23. The modem of claim 22, wherein each of the variable resistances comprise a plurality of resistors connected in parallel with one another, each of the plurality of resistors being selectably enabled and disabled.

24. The modem of claim 17, wherein the second input impedance network has an impedance selected from one of a second plurality of input impedance values;
   and wherein the second feedback impedance network has an impedance selected from one of a second plurality of feedback impedance values.

25. The modem of claim 17, wherein the analog signals are received on first and second differential inputs;
   wherein the first operational amplifier has a non-inverting input and an inverting input, and a non-inverting output and an inverting output;
   wherein the first differential input is coupled to the inverting input of the first operational amplifier through the first input impedance network;
   wherein the first feedback impedance network is coupled between the non-inverting output and the inverting input of the first operational amplifier;
   and further comprising:
      a third input impedance network, coupled between the second differential input and the noninverting input of the first operational amplifier, and having an impedance selected from one of a third plurality of input impedance values; and
      a third feedback impedance network, coupled between the inverting output and the noninverting input of the first operational amplifier, and having an impedance selected from one of a third plurality of input impedance values.

26. The modem of claim 17, wherein the second operational amplifier has a non-inverting input and an inverting input, and a non-inverting output and an inverting output;
   wherein the inverting output of the first operational amplifier is coupled to the inverting input of the second operational amplifier through the second input impedance network;
   wherein the second feedback impedance network is coupled between the non-inverting output and the inverting input of the second operational amplifier;
   and further comprising:
      a fourth input impedance network, coupled between a second input of the receive equalizer circuit and the noninverting input of the first operational amplifier; and
      a fourth feedback impedance network, coupled between the inverting output and the noninverting input of the first operational amplifier.

27. The modem of claim 17, wherein the first receive frequency band includes frequencies higher than frequencies within the first transmit frequency band.

* * * * *